United States Patent
Liou et al.

(10) Patent No.: US 11,523,417 B2
(45) Date of Patent: Dec. 6, 2022

(54) METHOD AND APPARATUS FOR DOWNLINK DATA BUFFERING CONSIDERING CROSS CARRIER SCHEDULING IN A WIRELESS COMMUNICATION SYSTEM

(71) Applicant: ASUSTek Computer Inc., Taipei (TW)

(72) Inventors: Jia-Hong Liou, Taipei (TW); Ko-Chiang Lin, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 21 days.

(21) Appl. No.: 17/086,353

(22) Filed: Oct. 31, 2020

(65) Prior Publication Data

US 2021/0051693 A1 Feb. 18, 2021

Related U.S. Application Data

(63) Continuation of application No. 16/364,065, filed on Mar. 25, 2019, now Pat. No. 10,856,316.

(60) Provisional application No. 62/648,194, filed on Mar. 26, 2018.

(51) Int. Cl.
*H04W 72/12* (2009.01)
*H04L 5/00* (2006.01)

(52) U.S. Cl.
CPC ... *H04W 72/1273* (2013.01); *H04W 72/1205* (2013.01); *H04W 72/1289* (2013.01); *H04L 5/001* (2013.01); *H04L 5/0053* (2013.01)

(58) Field of Classification Search
CPC ......... H04W 72/1273; H04W 72/1205; H04W 72/1289; H04L 5/001; H04L 5/0053
See application file for complete search history.

(56) References Cited

U.S. PATENT DOCUMENTS

| | | | | |
|---|---|---|---|---|
| 8,346,173 | B2 * | 1/2013 | Chen | H04W 72/082 370/332 |
| 8,934,326 | B2 * | 1/2015 | Bhattad | H04J 11/005 370/252 |
| 9,461,802 | B2 * | 10/2016 | Park | H04L 1/18 |

* cited by examiner

*Primary Examiner* — Chandrahas B Patel
(74) *Attorney, Agent, or Firm* — Skaar Ulbrich Macari, P.A.

(57) ABSTRACT

Methods and apparatuses for downlink data buffering considering cross carrier scheduling in a wireless communication system. The UE receives configuration of a first serving cell and a second serving cell from a network and receives and/or monitors a first PDCCH transmitted on the second serving cell, wherein the first PDCCH schedules a first PDSCH. The UE receives and/or monitors a second PDCCH transmitted on the second serving cell, receives and/or buffers the second PDSCH based on a first TCI state used for PDCCH quasi co-location indication of a CORESET, and receives and/or buffers the first PDSCH based on a second TCI state.

14 Claims, 7 Drawing Sheets

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

FIG. 5

METHOD AND APPARATUS FOR DOWNLINK DATA BUFFERING CONSIDERING CROSS CARRIER SCHEDULING IN A WIRELESS COMMUNICATION SYSTEM

CROSS-REFERENCE TO RELATED APPLICATIONS

The present application is a continuation of U.S. patent application Ser. No. 16/364,065, filed Mar. 25, 2019, which claims priority to and the benefit of U.S. Provisional Patent Application Ser. No. 62/648,194, filed on Mar. 26, 2018, with the entire disclosures of these applications fully incorporated herein by reference.

FIELD

This disclosure generally relates to wireless communication networks, and more particularly, to a method and apparatus for downlink data buffering considering cross carrier scheduling in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

Methods and apparatuses for downlink data buffering considering cross carrier scheduling in a wireless communication system are disclosed herein. In one method, the UE receives a configuration of a first serving cell and a second serving cell from a network. The UE receives and/or monitors a first PDCCH transmitted on a scheduling CORESET of the second serving cell, wherein the first PDCCH schedules a first PDSCH transmitted on the first serving cell. The UE receives and/or monitors a second PDCCH transmitted on a scheduling CORESET of the second serving cell, wherein the second PDCCH schedules a second PDSCH transmitted on the second serving cell. The UE receives and/or buffers the second PDSCH via a TCI state used for PDCCH quasi co-location indication of the CORESET with the lowest CORESET-ID in the latest slot in which one or more CORESETs are configured for the UE, before the UE decodes successfully the second PDCCH. The UE does not receive and/or buffer the first PDSCH before the UE decodes successfully the first PDCCH.

BRIEF DESCRIPTION OF THE DRAWINGS

FIG. 5 is a reproduction of Table 7.3.2.1-1 taken from 3GPP 3GPP R1-1721341.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio) wireless access for 5G, or some other modulation techniques.

In particular, the exemplary wireless communication systems devices described below may be designed to support one or more standards such as the standard offered by a consortium named "3rd Generation Partnership Project" referred to herein as 3GPP, including: R1-1801292, 3GPP TS 38.212 V15.0.1 (2018-02) 3rd Generation Partnership Project, Technical Specification Group Radio Access Network, NR, Multiplexing and channel coding (Release 15); R1-1801294, 3GPP TS 38.214 V15.0.0 (2018-02) 3rd Generation Partnership Project, Technical Specification Group Radio Access Network, NR, Physical layer procedures for data (Release 15); Final Report of 3GPP TSG RAN WG1 #85 v1.0.0; Final Report of 3GPP TSG RAN WG1 #86 v1.0.0; Final Report of 3GPP TSG RAN WG1 #86bis v1.0.0; Final Report of 3GPP TSG RAN WG1 #87 v1.0.0; Final Report of 3GPP TSG RAN WG1 #AH1_NR v1.0.0; Final Report of 3GPP TSG RAN WG1 #88 v1.0.0; Final Report of 3GPP TSG RAN WG1 #88bis v1.0.0; Final Report of 3GPP TSG RAN WG1 #89 v1.0.0; Final Report of 3GPP TSG RAN WG1 #AH_NR3 v1.0.0; Final Report of 3GPP TSG RAN WG1 #90bis v1.0.0; Final Chairman's Note of 3GPP TSG RAN WG1 Meeting #91; Final Report of 3GPP TSG RAN WG1 #AH_1801 v1.0.0; and Draft Report of 3GPP TSG RAN WG1 #92 v0.2.0. The standards and documents listed above are hereby expressly incorporated by reference in their entirety.

Figure 1:
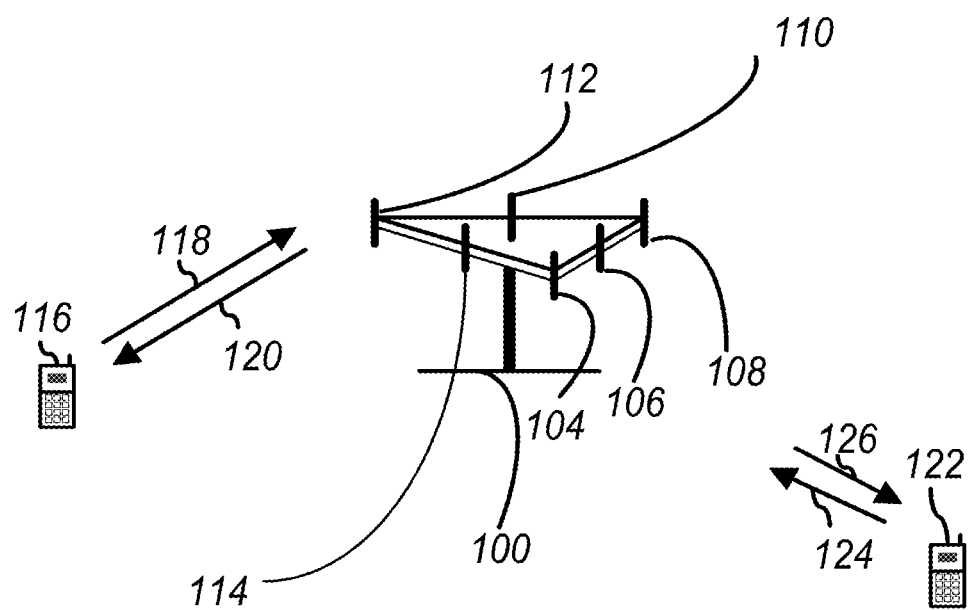
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), a network node, a network, or some other terminology. An access terminal (AT) may also be called user equipment (UE), a wireless communication device, terminal, access terminal or some other terminology.

Figure 2:
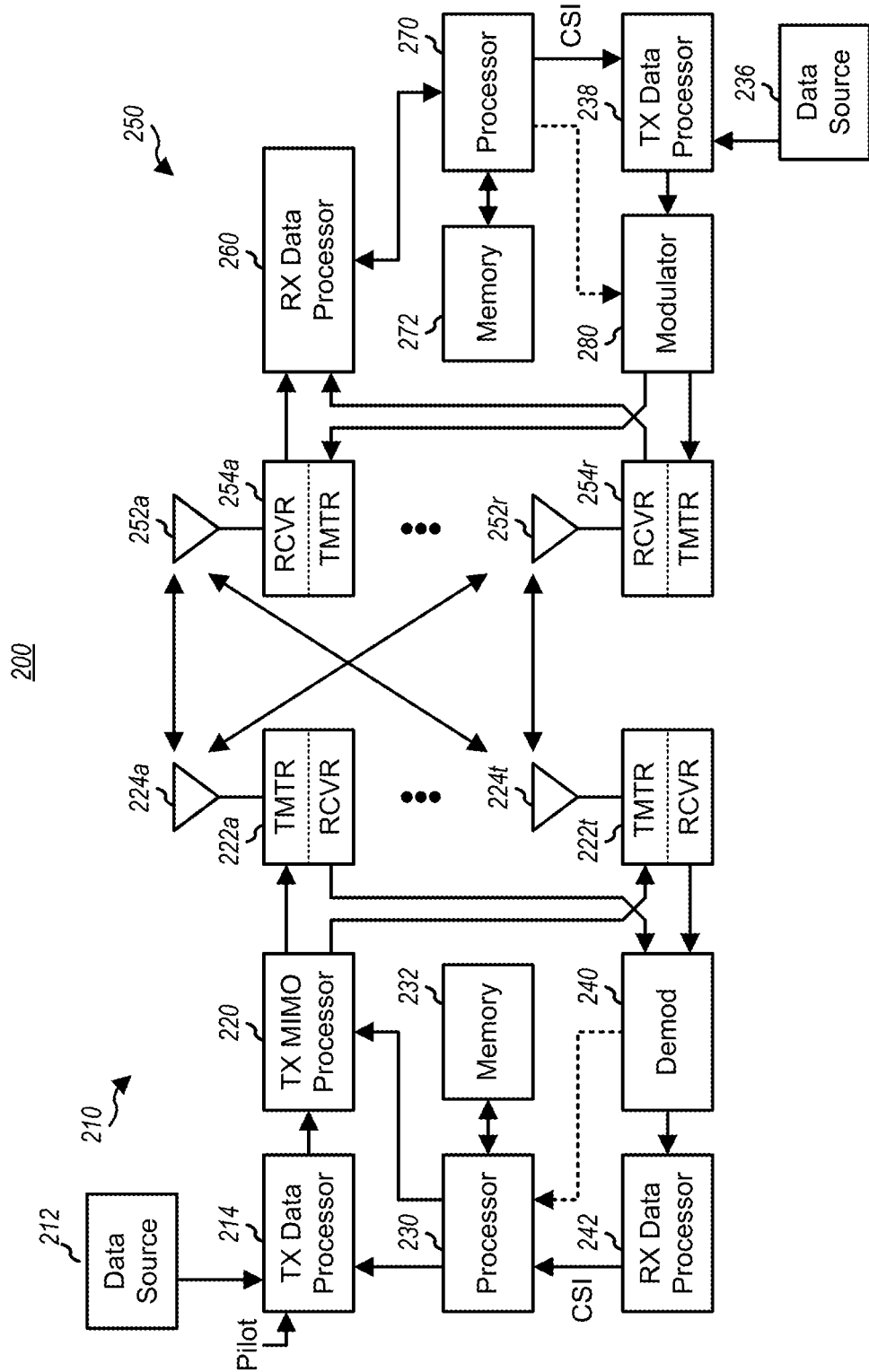
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and down converts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
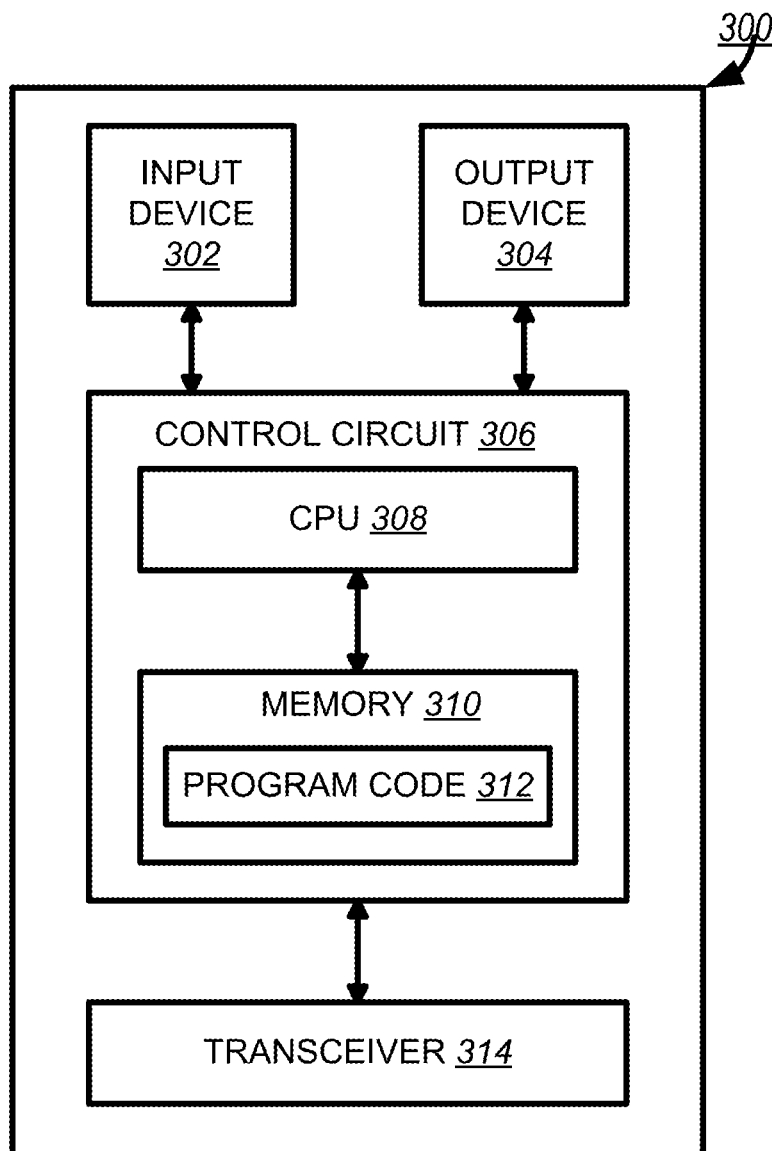
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE system or the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
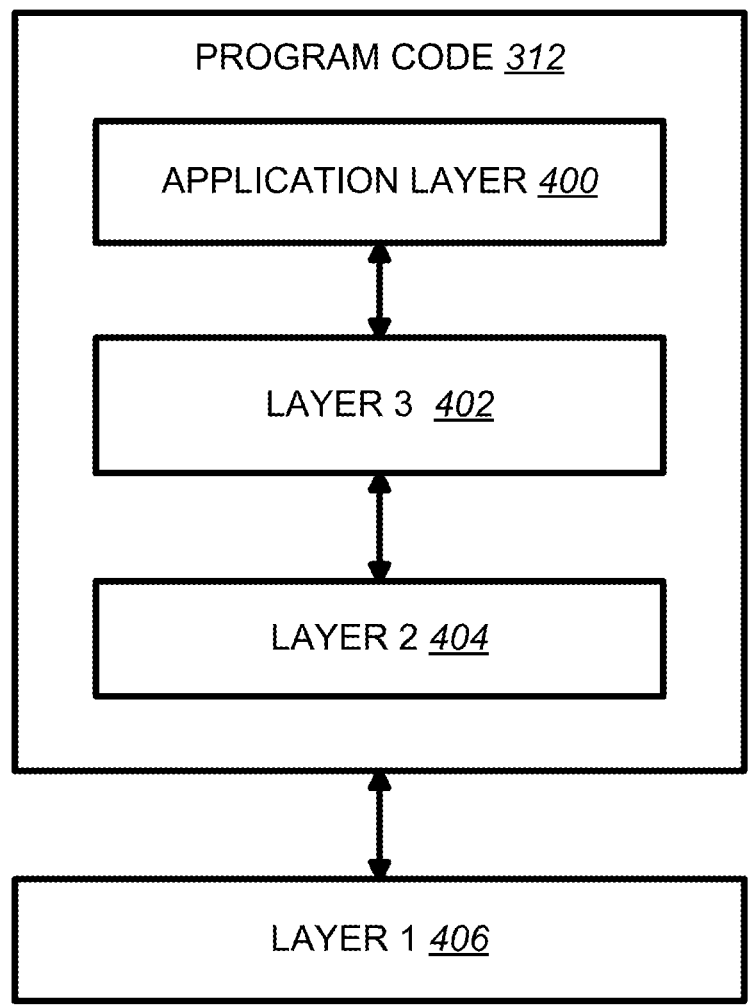
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

Some descriptions of a downlink control information (DCI) format of a signal transmitted on a Physical Downlink Control Channel (PDCCH) as disclosed in 3GPP R1-1801292 3GPP TS 38.212 V15.0.1 are quoted below:

7.3.1 DCI Formats

The DCI formats defined in table 7.3.1-1 are supported.

FIG. 5 (a reproduction of Table 7.3.1-1 taken from 3GPP R1-1801292).

7.3.1.2 DCI Formats for Scheduling of PDSCH 7.3.1 0.2.1 Format 1_0

DCI format 1_0 is used for the scheduling of PDSCH in one DL cell.

The following information is transmitted by means of the DCI format 1_0 with CRC scrambled by C-RNTI:

Identifier for DCI formats—[1] bits

Frequency domain resource assignment —$\lceil \log_2(N_{RB}^{DL,BWP}(N_{RB}^{DL,BWP}+1)/2) \rceil$ bits $N_{RB}^{DL,BWP}$ is the size of the initial bandwidth part in case DCI format 1_0 is monitored in the common search space in CORESET 0

$N_{RB}^{DL,BWP}$ is the size of the active bandwidth part otherwise

Time domain resource assignment—X bits as defined in Subclause 5.1.2.1 of [6, TS38.214]

VRB-to-PRB mapping—1 bit

Modulation and coding scheme—5 bits as defined in Subclause 5.1.3 of [6, TS38.214]

New data indicator—1 bit

Redundancy version—2 bits as defined in Table 7.3.1.1.1-2

HARQ process number—4 bits

Downlink assignment index—2 bits as defined in Subclause 9.1.3 of [5, TS38.213], as counter DAI TPC command for scheduled PUCCH—[2] bits as defined in Subclause 7.2.1 of [5, TS38.213]

PUCCH resource indicator—[2] bits as defined in Subclause 9.2.3 of [5, TS38.213]

PDSCH-to-HARQ_feedback timing indicator—[3] bits as defined in Subclause x.x of [5, TS38.213]

The following information is transmitted by means of the DCI format 1_0 with CRC scrambled by P-RNTI:

Short Messages Indicator—1 bit. This bit is used to indicate whether the short message only or scheduling information only is carried in the Paging DCI.

The following information is transmitted by means of the DCI format 1_0 with CRC scrambled by SI-RNTI:

XXX—x bit

The following information is transmitted by means of the DCI format 1_0 with CRC scrambled by RA-RNTI:

XXX—x bit

The following information is transmitted by means of the DCI format 1_0 with CRC scrambled by CS-RNTI:

XXX—x bit

If the number of information bits in format 1_0 prior to padding is less than the payload size of format 0_0 for scheduling the same serving cell, zeros shall be appended to format 1_0 until the payload size equals that of format 0_0.

7.3.1.2.2 Format 1_1

DCI format 1_1 is used for the scheduling of PDSCH in one cell.

The following information is transmitted by means of the DCI format 1_1 with CRC scrambled by C-RNTI:

Carrier indicator—0 or 3 bits as defined in Subclause x.x of [5, TS38.213].

< . . . >

Time domain resource assignment—0, 1, 2, 3, or 4 bits as defined in Subclause 5.1.2.1 of [6, TS38.214]. The bitwidth for this field is determined as $\lceil \log_2(I) \rceil$ bits, where I is the number of rows in the higher layer parameter [pdsch-symbolAllocation].

< . . . >

Transmission configuration indication—0 bit if higher layer parameter tci-PresentInDCI is not enabled; otherwise 3 bits as defined in Subclause x.x of [6, TS38.214].

Some descriptions of a Downlink (DL) resource assignment are disclosed in 3GPP R1-1801294 3GPP TS 38.214 V15.0.0 as quoted below:

5.1.2.1 Resource Allocation in Time Domain

When the UE is scheduled to receive PDSCH by a DCI, the Time domain resource assignment field of the DCI provides a row index of an RRC configured table pdsch-symbolAllocation, where the indexed row defines the slot offset $K_0$, the start and length indicator SLIV, and the PDSCH mapping type to be assumed in the PDSCH reception. Given the parameter values of the indexed row:

The slot allocated for the PDSCH is $$\left\lfloor n \cdot \frac{2^{\mu_{PDSCH}}}{2^{\mu_{PDCCH}}} \right\rfloor + K_0,$$

where n is the slot with the scheduling DCI, and $K_0$ is based on the numerology of PDSCH, and The starting symbol S relative to the start of the slot, and the number of consecutive symbols L counting from the symbol S allocated for the PDSCH are determined from the start and length indicator SLIV:
if (L−1)≤7 then
    SLIV=14·(L−1)+S
else
    SLIV=14·(14−L+1)+(14−1−S)
where 0<L≤14−S, and The PDSCH mapping type is set to Type A or Type B as defined in sub-clause 7.4.1.1.2 of [4, TS 38.211].

The UE shall consider the S and L combinations satisfying the following conditions as valid PDSCH allocations:

For PDSCH mapping type A: S∈{0,1,2,3}, L∈{[X], . . . , 14}

For PDSCH mapping type B: S∈{0, . . . , 12}, L∈{2,4,7}

The UE is not expected to receive any TB across slot boundaries determined by the numerology associated with the PDSCH transmission.

When the UE is configured with aggregationFactorDL>1, the UE may expect that the TB is repeated within each symbol allocation among each of the aggregationFactorDL consecutive slots and the PDSCH is limited to a single transmission layer.

If the UE procedure for determining slot configuration as defined in Subclause 11.1 of [6, TS 38.213] determines symbol of a slot allocated for PDSCH as uplink symbols, the transmission on that slot is omitted for multi-slot PDSCH transmission.

As disclosed in 3GPP TSG RAN WG1 #86 v1.0.0 (Final Report), the following quotations describe some agreements on beam management:

| R1-168468 Definitions supporting beam related procedures Nokia, Qualcomm, CATT, Intel, NTT DoCoMo, Mediatek, Ericsson, ASB, Samsung, LGE |
|---|
| {<br>    Beam management = a set of L1/L2 procedures to acquire and maintain a set of TRP(s) and/or UE beams that can be used for DL and UL transmission/reception, which include at least following aspects:<br>        Beam determination = for TRP(s) or UE to select of its own Tx/Rx beam(s).<br>        Beam measurement = for TRP(s) or UE to measure characteristics of received beamformed signals<br>        Beam reporting = for UE to report information a property/quality of of beamformed signal(s) based on beam measurement<br>        Beam sweeping = operation of covering a spatial area, with beams transmitted and/or received during a time interval in a predetermined way.<br>} |

As disclosed in 3GPP TSG RAN WG1 #86bis v1.0.0 (Final Report), the following quotations describe some agreements on beam management in RAN1:

R1-1610825 WF on Beam Management CATT, CATR, CMCC, Xinwei

Agreements:

For downlink, NR supports beam management with and without beam-related indication When beam-related indication is provided, information pertaining to UE-side beamforming/receiving procedure used for data reception can be indicated through QCL to UE As disclosed in 3GPP TSG RAN WG1 #87 v1.0.0 (Final Report), the following quotations describe some agreements on beam management:

R1-1613670 WF on Beam Management for Control and Data Channel ZTE, ZTE Microelectronics, ASTRI, Intel, Samsung, LGE Agreements:

NR supports with and without a downlink indication to derive QCL assumption for assisting UE-side beamforming for downlink control channel reception As disclosed in 3GPP TSG RAN WG1 #AH1_NR v1.0.0 (Final Report), the following quotations describe some agreements on beam management:

R1-1701506 WF on Beam Indication Samsung, Ericsson, KT Corp., Verizon, NTT DOCOMO, AT&T, LGE Agreements:

For reception of DL control channel, support indication of spatial QCL assumption between an DL RS antenna port(s), and DL RS antenna port(s) for demodulation of DL control channel Note: Indication may not be needed for some cases:

For reception of DL data channel, support indication of spatial QCL assumption between DL RS antenna port(s) and DMRS antenna port(s) of DL data channel Different set of DMRS antenna port(s) for the DL data channel can be indicated as QCL with different set of RS antenna port(s)

Option 1: Information indicating the RS antenna port(s) is indicated via DCI

Option 2: Information indicating the RS antenna port(s) is indicated via MAC-CE, and will be assumed until the next indication Option 3: Information indicating the RS antenna port(s) is indicated via a combination of MAC CE and DCI At least one option is supported Note: Indication may not be needed for some cases:

As disclosed in 3GPP TSG RAN WG1 #88 v.1.0.0 (Final Report), the following quotations describe some agreements on beam management in RAN1:

R1-1703958 WF on Beam Indication Samsung, KT Corp., NTT DOCOMO, Verizon, Intel, CATT, Ericsson, Huawei, HiSilicon Agreements:

For reception of unicast DL data channel, support indication of spatial QCL assumption between DL RS antenna port(s) and DMRS antenna port(s) of DL data channel: Information indicating the RS antenna port(s) is indicated via DCI (downlink grants)

The information indicates the RS antenna port(s) which is QCL-ed with DMRS antenna port(s)

Note: related signalling is UE-specific

As disclosed in 3GPP TSG RAN WG1 #89 v1.0.0 (Final Report), the following quotations describe some agreements on beam management:

R1-1709496 Potential Agreements on Beam Management Qualcomm

Agreements:

Support spatial QCL assumption between antenna port(s) within a CSI-RS resource(s) and antenna port of an SS Block (or SS block time index) of a cell The other QCL parameters not precluded Note: default assumption may be no QCL Configuration of QCL for UE specific NR-PDCCH is by RRC and MAC-CE signalling Note that MAC-CE is not always needed Note: For example, DL RS QCLed with DMRS of PDCCH for delay spread, Doppler spread, Doppler shift, and average delay parameters, spatial parameters As disclosed in 3GPP TSG RAN WG1 #AH_NR3 v1.0.0 (Final Report), the following quotations describe some agreements on beam management:

R1-1716842 WF on QCL Indication for DL Physical Channels Ericsson, CATT, NTT Docomo, Samsung, Qualcomm Agreement:

A UE is RRC configured with a list of up to M candidate Transmission Configuration Indication (TCI) states at least for the purposes of QCL indication Each TCI state can be configured with one RS Set Each ID (FFS: details of ID) of DL RS at least for the purpose of spatial QCL in an RS Set can refer to one of the following DL RS types:

SSB

Periodic CSI-RS

Aperiodic CSI-RS

Semi-persistent CSI-RS

Agreement:
The QCL configuration for PDCCH contains the information which provides a reference to a TCI state
  Note: The indication of QCL configuration is done by RRC or RRC+MAC CE
R1-1716890 Summary on Beam Management Offline Qualcomm
Agreement:
  For QCL indication for PDSCH:
    When TCI states are used for QCL indication, the UE receives an N-bit TCI field in DCI
      The UE assumes that the PDSCH DMRS is QCL with the DL RS(s) in the RS Set corresponding to the signaled TCI state
  FFS: Timing between when the UE receives a QCL configuration/indication and the first time that the QCL assumption may be applied for demodulation of PDSCH or PDCCH
As disclosed in 3GPP TSG RAN WG1 #90bis v1.0.0 (Final Report), the following quotations describe some agreements on beam management:
R1-1718920 Beam Management Offline Discussion Summary Qualcomm
Agreement:
Support at least the explicit approach for the update of spatial QCL reference in a TCI state.
  Note: In the explicit approach, the TCI state is updated using either RRC or RRC+MAC-CE based approach
  Note: In the implicit approach, when a set of aperiodic CSI-RS resources are triggered, the triggering DCI includes a TCI state index which provides spatial QCL reference for the triggered set of CSI-RS resources. Following the measurement, the spatial QCL reference in the RS set corresponding to the indicated TCI state is updated based on the preferred CSI-RS determined by the UE. Other operations of implicit approaches are not precluded.
R1-1719059 WF on Beam Management Samsung, CATT, Huawei, HiSilicon, NTT Docomo, MediaTek, Intel, OPPO, SpreadTrum, AT&T, InterDigital, CHTTL, KDDI, LG Electronics, Sony, China Unicom, Ericsson, VIVO, China Telecom, Qualcomm, National Instruments, Vodafone
Also supported by Verizon
Agreement:
  Proposal: Update the association of TCI state and DL RS
    Initialization/Update of the ID of a DL RS(s) in the RS Set used at least for spatial QCL purposes is done at least via explicit signalling Support the following methods for the explicit signalling:
    RRC
    RRC+MAC-CE
  Proposal: Presence of TCI in DCI
  For the case when at least spatial QCL is configured/indicated, support higher-layer UE-specific configuration of whether or not TCI field is present in DL-related DCI
    Not present: No dynamic indication of QCL parameters for PDSCH is provided in DL-related DCI
      For PDSCH, UE applies higher-layer signalling of QCL parameters/indication for determining QCL parameters except for the case of beam management without beam-related indication (ref:Annex) where no spatial QCL parameters are higher layer configured
    Present: Details on next proposal.
    Proposed candidate solutions should consider
      Below and above 6 GHz DL beam related operation with and without beam indication
      Downlink beam management with and without beam indication (ref Annex)
    Note: this proposal does not apply to the case of beam management without beam-related indication (ref: Annex)
  Proposal: Timing issue of beam indication for PDSCH
  For the case when at least spatial QCL is configured/indicated, NR supports the beam indication for PDSCH as follows, if TCI field is present:
    The TCI field is always present in the associated DCI for PDSCH scheduling irrespective of same-slot scheduling or cross-slot scheduling.
    If the scheduling offset <threshold K: PDSCH uses a pre-configured/pre-defined/rule-based spatial assumption
      Threshold K can be based on UE capability only if multiple candidate values of K are supported.
    If the scheduling offset >=threshold K: PDSCH uses the beam (spatial QCL parameter) indicated by the N-bit TCI field in the assignment DCI.
  Note: this proposal does not apply to the case of beam management without beam-related indication
}
Agreements:
  Support parameter Is-TCI-Present
    Whether for the case when at least spatial QCL is configured/indicated, if TCI field is present or not present in DL-related DCI.
    Boolean
    Default is True
  For the case when TCI is not present in DL-related DCI, continue discussion of the details regarding higher-layer signaling of QCL parameters/indication for determining QCL parameters for PDSCH
  NR supports a mechanism to identify the spatial QCL if the offset between the time of reception of DL assignment for the PDSCH and time of reception of PDSCH is less than Threshold-Sched-Offset.
  NR does not support the RRC parameter in beam management: Threshold-Sched-Offset.
    FFS if such a parameter is included as a UE capability
As disclosed in 3GPP TSG RAN WG1 Meeting #91 (Final Chairman's Note), the following quotations describe some agreements on beam management:
R1-1721396 Summary of Beam Mgmt Open Issues Qualcomm
Agreement:
  The state Is-TCI-Present is configured on a per-CORESET basis
  For beam management with beam indication, on all CORESETs configured with Is-TCI-Present=false, the TCI state used for PDCCH is reused for PDSCH reception
Agreement:
  A candidate set of DL RSs are configured using RRC mechanism
    Each state of M TCI states is RRC configured with a downlink RS set used as a QCL reference, and
    MAC-CE is used to select up to $2^N$ TCI states out of M for PDSCH QCL indication
      The same set of M TCI states are reused for CORESET
      K TCI states are configured per CORESET
      When K>1, MAC CE can indicate which one TCI state to use for control channel QCL indication
      When K=1, no additional MAC CE signaling is necessary R1-1721640 Summary of Beam Mgmt Qualcomm
Agreement:
  When the scheduling offset is <=k, the PDSCH uses QCL assumption that is based on a default TCI state (e.g. the first state of the 2^N states used for PDSCH QCL indication)
Agreement
Between initial RRC configuration and MAC CE activation of TCI states, the UE may assume that both PDCCH and PDSCH DMRS are spatially QCL-ed with the SSB determined during initial access
R1-1721696 Summary of Beam Mgmt Qualcomm
Agreement:
  When the scheduling offset is <=k, and the PDSCH uses QCL assumption that is based on a default TCI state
    The default TCI state corresponds to the TCI state used for control channel QCL indication for the lowest CORESET ID in that slot The following terminology and assumptions may be used hereinafter.
  BS: a network central unit or a network node in NR which is used to control one or multiple TRPs which are associated with one or multiple cells. Communication between BS and TRP(s) is via fronthaul. BS may be referred to as central unit (CU), eNB, gNB, or NodeB.
  TRP: a transmission and reception point provides network coverage and directly communicates with UEs. TRP may be referred to as distributed unit (DU) or network node.
  Cell: a cell is composed of one or multiple associated TRPs, i.e. coverage of the cell is composed of coverage of all associated TRP(s). One cell is controlled by one BS. Cell may be referred to as TRP group (TRPG).
  Serving beam: serving beam for a UE is a beam generated by a network node, e.g. TRP, which is configured to be used to communicate with the UE, e.g. for transmission and/or reception.
  Candidate beam: candidate beam for a UE is a candidate of a serving beam. Serving beam may or may not be candidate beam.

When a UE receives a Physical Downlink Shared Channel (PDSCH), the UE may determine the antenna port quasi co-location for PDSCH reception according to the Transmission Configuration Indication (TCI) field in the scheduling Physical Downlink Control Channel (PDCCH). As described in 3GPP TSG RAN WG1 #87 v1.0.0 (Final Report), if the TCI-PresentInDCI is set as 'Disabled' for the Control Resource Set (CORESET) scheduling the PDSCH or the PDSCH is scheduled by a DCI format 1_0, for determining PDSCH antenna port quasi co-location, the UE assumes that the TCI state for the PDSCH is identical to the TCI state applied to the CORESET used for the PDCCH transmission. If the TCI-PresentinDCI is set as 'Enabled', the UE shall use the TCI-States according to the value of the 'Transmission Configuration Indication' field in the detected Physical Downlink Control Channel (PDCCH) with the Downlink Control Information (DCI) for determining the antenna port quasi co-location for PDSCH reception.

The UE may assume that the antenna ports of one Demodulation Reference Signal (DM-RS) port group of the PDSCH of a serving cell are quasi co-located with the Reference Signal(s) (RS(s)) in the RS set with respect to the Quasi Co-location (QCL) type parameter(s) given by the indicated TCI state if the time offset between the reception of the DL DCI and the corresponding PDSCH is equal to or greater than a threshold Threshold-Sched-Offset, where the threshold is related to the UE capability. For both the cases when TCI-PresentInDCI='Enabled' and TCI-PresentInDCI='Disabled', if the offset between the reception of the Downlink (DL) DCI and the corresponding PDSCH is less than the threshold Threshold-Sched-Offset, the UE may assume that the antenna ports of one DM-RS port group of the PDSCH of a serving cell are quasi co-located based on the TCI state used for the PDCCH quasi co-location indication of the lowest CORESET-ID in the latest slot in which one or more CORESETs are configured for the UE.

In other words, before the UE decodes a scheduling PDCCH (successfully), the UE receives and/or buffers the scheduled PDSCH via using the TCI state or spatial parameter or beam for receiving the CORESET with the lowest identification (ID) in the latest slot in which one or more CORESETs are configured for the UE, e.g., the CORESET with the lowest identification (ID) monitored in the latest slot in which one or more CORESETs are monitored by the UE. However, for the cross carrier scheduling case, the story may be different.

For cross carrier scheduling case, the CORESET configuration of a scheduled serving cell and a scheduling serving cell can be categorized into at least the following cases.

Case 1: the network does not configure the CORESET configuration for the scheduled serving cell. In other words, the network prevents from or is not allowed to configure the CORESET configuration of the scheduled serving cell. The UE receives and/or monitors the PDCCH for the scheduled serving cell on the CORESETs or the CORESET configuration of the scheduling serving cell. For example, a scheduled serving cell is Cell 1 and a scheduling serving cell is Cell 2. The PDCCH of Cell 1 is transmitted on the CORESETs of Cell 2, and the UE receives and/or monitors the PDCCH of Cell 1 on the CORESETs of Cell 2.

Case 2: the network configures the CORESET configuration for a scheduled serving cell. The UE receives and/or monitors the PDCCH for the scheduled serving cell on the CORESETs of the scheduled serving cell. In one embodiment, the CORESETs of the scheduled serving cell may be transmitted on (the frequency resources of) the scheduling serving cell. In other words, the UE receives and/or monitors the PDCCH for the scheduled serving cell based on the CORESET configuration of the scheduled serving cell. For example, a scheduled serving cell is Cell 1 and a scheduling serving cell is Cell 2. The PDCCH of Cell 1 is transmitted on the CORESETs of Cell 1. The UE monitors the PDCCH of Cell 1 on the CORESETs of Cell 1. In one embodiment, the CORESETs of Cell 1 are transmitted on (the frequency resources of) Cell 2. In one embodiment, the UE monitors the PDCCH of Cell 1 on the CORESET(s) of Cell 1, wherein the CORESET(s) of Cell 1 is located on the frequency resources of Cell 2.

For Case 1, the UE receives a scheduling PDCCH transmitted on the CORESET(s) of Cell 2, wherein the scheduling PDCCH schedules a PDSCH transmitted on Cell 1. Before the UE decodes the scheduling PDCCH on Cell 2 (successfully), the UE receives and/or buffers the scheduled PDSCH of Cell 1 via using the TCI state or spatial parameter or beam for receiving the CORESET of Cell 2 with the lowest CORESET ID in the latest slot in which one or more CORESETs are configured for the UE.

However, the TCI state applied for the CORESET(s) of Cell 2 may not be appropriate for the PDSCH transmitted on Cell 1, at least in cases in which Cell 1 and Cell 2 are interband carriers. For example, Cell 1 is a carrier located on frequency band above 6 GHz and Cell 2 is a carrier located on frequency band below 6 GHz.

Hence, for a cross carrier scheduling case, at least for Case 1, before the scheduling PDCCH is decoded (successfully), how to receive and/or buffer the PDSCH of the scheduled serving cell needs to be considered if the scheduling PDCCH is transmitted on the CORESETs of the scheduling serving cell. That is, how to decide the TCI state (or the spatial parameter or the receiving beam) to receive and/or buffer the PDSCH transmitted on the scheduled serving cell before the scheduling PDCCH is decoded (successfully).

For Case 2, the UE receives a PDCCH transmitted on the CORESET(s) of Cell 1, wherein the PDCCH schedules a PDSCH transmitted on Cell 1. In one embodiment, the CORESETs of Cell 1 are transmitted on the frequency resources of Cell 2. Although Cell 1 has its own CORESET(s) transmitted on Cell 2, the UE may use the TCI states or spatial parameters or beams, for receiving CORESETs of Cell 2, to receive CORESETs of Cell 1. In one embodiment, a set of TCI states (TCI-StatesPDCCH), providing quasi co-location information for receiving the PDCCH, may or may not be configured in the CORESET configuration of Cell 1.

Since the CORESET(s) of Cell 1 is transmitted on (the frequency resources of) Cell 2, the UE may not be sure which serving cell for the UE as reference when referring to the CORESET with the lowest CORESET ID for the buffering scheduled PDSCH transmitted on Cell 1. That is, the CORESET with the lowest CORESET ID can be the CORESET with the lowest CORESET ID in Cell 1, Cell 2, or the CORESET with the lowest CORESET ID among the CORESETs in Cell 1 and Cell 2. Even before the UE decodes a scheduling PDCCH, it is using the TCI state or spatial parameter or beam for receiving the CORESET with the lowest ID of Cell 1 via which the UE receives and buffers the scheduled PDSCH, the TCI state or spatial parameter or beam for receiving the CORESET with the lowest ID of Cell 1 may not be appropriate.

Since the UE may use the TCI states or spatial parameters or beams, which is for receiving CORESETs of Cell 2, to receive CORESETs of Cell 1, it may not be appropriate for the UE to receive the PDSCH in Cell 1 by using that for receiving the CORESETs of Cell 2 before the UE decodes a PDCCH. For example, Cell 1 and Cell 2 are interband carriers. Like the issue in Case 1, how to decide the TCI state (or spatial parameter or receiving beam) to receive and/or buffer the PDSCH transmitted on the scheduled serving cell, before the scheduling PDCCH is decoded (successfully), needs to be considered.

In this specification, the following solutions or embodiments can be used, at least but not limited to, to handle cross carrier scheduling cases or to determine the TCI states or spatial parameters or receiving beams for receiving the PDSCH of a scheduled serving cell before the UE decodes a PDCCH.

According to one concept, before a UE decodes a PDCCH successfully in a scheduling serving cell, the UE may not assume that the PDSCH antenna port quasi co-location for receiving the PDSCH in a scheduled serving cell is based on the quasi co-location information for receiving the CORESET with the lowest CORESET-ID, transmitted in the scheduling serving cell, in the latest slot in which one or more CORESETs of the scheduling serving cell are configured for the UE.

In one embodiment, before the UE decodes a PDCCH successfully in a scheduling serving cell, the UE may not assume that the antenna ports of one DM-RS port group of a PDSCH of a scheduled serving cell are quasi co-located based on the TCI state used for PDCCH quasi co-location indication of the CORESET with the lowest CORESET-ID, transmitted in the scheduling serving cell, in the latest slot in which one or more CORESETs of the scheduling serving cell are configured for the UE.

In one embodiment, the CORESET with the lowest CORESET-ID may be selected among the CORESETs configured for the scheduling serving cell.

In one embodiment, the CORESET with the lowest CORESET-ID may be selected among the CORESETs configured for the scheduled serving cell.

In one embodiment, the CORESET with the lowest CORESET-ID may be selected among the CORESETs configured for the scheduling serving cell and the CORESETs configured for the scheduled serving cell.

In another concept, before a UE decodes a PDCCH successfully in a scheduling serving cell, the UE determines the PDSCH antenna port quasi co-location for receiving the PDSCH in a scheduled serving cell based on a higher layer configuration.

In one embodiment, before the UE decodes a PDCCH successfully in a scheduling serving cell, the UE determines the PDSCH antenna port quasi co-location for receiving PDSCH in a scheduled serving cell based on an indicator.

In one embodiment, before the UE decodes a PDCCH successfully in a scheduling serving cell, the UE interprets a TCI state applied for the CORESET with the lowest CORESET-ID, transmitted in the scheduling serving cell, based on a higher layer configuration or an indicator.

In one embodiment, before the UE decodes a PDCCH successfully in a scheduling serving cell and for determining the PDSCH antenna port quasi co-location for receiving PDSCH in a scheduled serving cell, the UE uses the TCI state applied to the CORESET with the lowest CORESET-ID transmitted in the scheduling serving cell.

In another concept, if the network configures a corresponding CORESET configuration for scheduled serving cells, the parameter providing quasi co-location information for receiving PDCCH (e.g., TCI-StatesPDCCH) may or may not be configured. This may mean that if the network configures a corresponding CORESET configuration for the scheduled serving cells, the parameter providing the quasi co-location information for receiving the PDCCH (e.g. TCI-StatesPDCCH) is not allowed to be configured.

In one embodiment, if the network configures a corresponding CORESET configuration for the scheduled serving cells, the parameter providing the quasi co-location information for the receiving PDCCH (e.g. TCI-StatesPDCCH) may be ignored or may not be used when the PDCCH of scheduled serving cell is transmitted on the scheduling serving cell.

In one embodiment, if the network configures a corresponding CORESET configuration for the scheduled serving cells, the TCI-StatesPDCCH in the CORESETs of the scheduled serving cell is not configured.

In one embodiment, if the network configures a corresponding CORESET configuration for the scheduled serving cells, the TCI-StatesPDCCH in the CORESETs of the scheduled serving cell is ignored or not used by a UE when the UE receives or monitors the PDCCH of the scheduled serving cell on the scheduling serving cell.

In one embodiment, if the network configures a corresponding CORESET configuration for the scheduled serving cells, the UE uses the TCI states or spatial parameters or receiving beams, for receiving the CORESETs of the scheduling serving cell, to receive the CORESETs of the scheduled serving cell.

In one embodiment, if network configures a corresponding CORESET configuration for scheduled serving cells, TCI-StatesPDCCH in CORESETs of scheduled serving cell comprises a set of TCI states, wherein the set of TCI states are associated with the reference signals transmitted in the scheduling serving cell.

In one embodiment, if the network configures a corresponding CORESET configuration for the scheduled serving cells, the UE interprets the RS indices in the TCI-StatesPDCCH in the CORESETs of the scheduled serving cell by associating those with the reference signals transmitted in the scheduling serving cell.

In another concept, if the UE receives a PDSCH in a serving cell, wherein a scheduling PDCCH, which schedules the PDSCH, is transmitted on another serving cell, the UE may expect the time offset between the reception of the DCI of the scheduling PDCCH and the PDSCH to be greater than or equal to a threshold.

In one embodiment, if the UE receives a PDSCH in a serving cell, wherein a scheduling PDCCH, which schedules the PDSCH, is transmitted on another serving cell, the UE may not expect the time offset between the reception of the DCI of the scheduling PDCCH and the PDSCH to be less than the threshold.

In one embodiment, for both the cases when TCI-PresentInDCI is configured as 'Enabled' and when TCI-PresentInDCI is configured as 'Disabled' or not configured, if the UE receives a PDSCH in a serving cell, wherein a scheduling PDCCH, which schedules the PDSCH, is transmitted on another serving cell, the UE may not expect the time offset between the reception of the DCI of the scheduling PDCCH and the PDSCH to be less than the threshold.

In one embodiment, if the UE receives a PDSCH in a serving cell, wherein a scheduling PDCCH, which schedules the PDSCH, is transmitted on another serving cell, and if the time offset between the reception of the DCI of the scheduling PDCCH and the PDSCH is less than the threshold, the UE does not receive and/or decode the PDSCH in the serving cell or the remaining PDSCH in the serving cell.

In one embodiment, if the UE receives a PDSCH in a serving cell, wherein a scheduling PDCCH, which schedules the PDSCH, is transmitted on another serving cell, and if the time offset between the reception of the DCI of the scheduling PDCCH and the PDSCH is less than the threshold, the UE discards the PDSCH in the serving cell or discards the remaining PDSCH in the serving cell.

In one embodiment, if the UE receives a PDSCH in a serving cell, wherein a scheduling PDCCH, which schedules the PDSCH, is transmitted on another serving cell, and if the time offset between the reception of the DCI of the scheduling PDCCH and the PDSCH is less than the threshold, the UE detects or considers the scheduling PDCCH is an inconsistent control information.

In one embodiment, if the UE receives a PDSCH in a serving cell, wherein a scheduling PDCCH, which schedules the PDSCH, is transmitted on another serving cell, and if the time offset between the reception of the DCI of the scheduling PDCCH and the PDSCH is less than the threshold, the UE does not transmit an acknowledgement signal, which corresponds to the PDSCH in the serving cell, to network, e.g. ACK/NACK.

Notably, the above-disclosed embodiments or concepts can be applied for both the cases when TCI-PresentInDCI is configured as 'Enabled' and when TCI-PresentInDCI is configured as 'Disabled' or not configured. For example, when TCI-PresentInDCI is configured as 'Enabled' and when TCI-PresentInDCI is configured as 'Disabled' or not configured, if the UE receives a PDSCH in a serving cell, wherein a scheduling PDCCH, which schedules the PDSCH, is transmitted on another serving cell, and if the time offset between the reception of the DCI of the scheduling PDCCH and the PDSCH is less than the threshold, the UE does not transmit an acknowledgement signal, which corresponds to the PDSCH in the serving cell, to network, e.g. ACK/NACK.

In some instances, the threshold is related to the time duration needed for the UE to decode a PDCCH successfully.

In some instances, the threshold is related to UE capability.

In some instances, the threshold can be Threshold-SchedOffset.

The above-disclosed concepts can be applied to at least (but not limited to) the following embodiments.

In one embodiment, a UE is configured with a first serving cell and a second serving cell. The control signal of the first serving cell is transmitted on the second serving cell, e.g., PDCCH scheduling PDSCH. The downlink data transmission of the first serving cell is transmitted on the first serving cell. The UE receives or monitors a first PDCCH transmitted on a scheduling CORESET of the second serving cell. A first PDSCH is transmitted on the first serving cell. In one instance, the first PDCCH may schedule the first PDSCH.

In one example, the UE receives or monitors a second PDCCH transmitted on the scheduling CORESET. In one instance, a second PDSCH is transmitted on the second serving cell. The second PDCCH may schedule the second PDSCH.

In some instances, a reference CORESET is a CORESET with the lowest CORESET-ID in the latest slot in which one or more CORESETs are configured for the UE.

In some instances, the reference CORESET is transmitted on the second serving cell.

In some instances, the reference CORESET may be a CORESET configured for the second serving cell.

In some instances, the reference CORESET may be a CORESET configured for the first serving cell.

In some instances, the reference CORESET may be a CORESET with the lowest CORESET-ID among CORESETs configured for the first serving cell and the CORESETs configured for the second serving cell.

Before the UE decodes the second PDCCH successfully, the UE may assume that the PDSCH antenna port quasi co-location for receiving the second PDSCH is based on the quasi co-location information for receiving the reference CORESET.

Alternatively, before the UE decodes the first PDCCH successfully, the UE may assume that the PDSCH antenna port quasi co-location for receiving the first PDSCH is not based on the quasi co-location information for receiving the reference CORESET.

Alternatively, before the UE decodes the first PDCCH successfully, the UE may determine the PDSCH antenna port quasi co-location based on a TCI state not for receiving the reference CORESET, wherein the PDSCH antenna port quasi co-location is for receiving the first PDSCH in a scheduled serving cell.

The following alternatives are provided for determining the TCI state applied for the first PDSCH, or for determining PDSCH antenna port quasi co-location, before the UE decodes the first PDCCH successfully.

One alternative is as the follows: before a UE decodes the first PDCCH successfully, the UE determines the PDSCH antenna port quasi co-location for receiving the first PDSCH based on a default TCI state.

In one embodiment, before a UE decodes the first PDCCH successfully, the UE receives the first PDSCH via the PDSCH antenna port quasi co-location derived from the default TCI state.

In one embodiment, the UE may assume that the antenna ports of one DM-RS port group of the first PDSCH are quasi co-located with the RS(s) in the RS set with respect to the QCL type parameter(s) given by the indicated TCI state if the time offset between the reception of the DL DCI of the first PDCCH and the first PDSCH is equal to or greater than a threshold Threshold-Sched-Offset, where the threshold is based on UE capability.

In one embodiment, for both the cases when TCI-PresentInDCI='Enabled' and when TCI-PresentInDCI='Disabled' or not configured, if the offset between the reception of the Downlink Control Information (DCI) of the first PDCCH and the first PDSCH is less than the threshold Threshold-Sched-Offset, the UE may assume that the antenna ports of one DM-RS port group of the first PDSCH are quasi co-located based on the default TCI state.

In one embodiment, the default TCI state is one of TCI states in the activated TCI states for receiving PDSCH in the first serving cell.

Additionally or alternatively, the default TCI state is a TCI state mapped to one of codeponints in the TCI field for receiving PDSCH in the first serving cell.

Additionally or alternatively, the default TCI state is the TCI state with the lowest TCI state ID in the activated TCI states for receiving PDSCH in the first serving cell.

Additionally or alternatively, the default TCI state is a TCI state mapped to codepoint 0 in the TCI field for receiving PDSCH in the first serving cell.

Additionally or alternatively, the default TCI state is the TCI state applied for receiving at least one of CORESETs configured for the first serving cell and/or the second serving cell.

Additionally or alternatively, the default TCI state is the TCI state applied for receiving the CORESET with the lowest CORESET ID among the CORESETs configured for the first serving cell and/or the second serving cell.

Another alternative is as follows: at least the TCI state applied for receiving the reference CORESET is at least associated with an index of the reference signal transmitted in the first serving cell and corresponding QCL type.

Additionally or alternatively, at least the TCI state applied for receiving the reference CORESET is at least associated with the index of a first reference signal and the index of a second reference signal and the corresponding QCL types. The first reference signal is transmitted on the first serving cell and the second reference signal is transmitted on the second serving cell.

Before the UE decodes the second PDCCH successfully, the UE assumes that the TCI state for receiving the second PDSCH is identical to the TCI state applied for the reference CORESET; the UE refers to the index of the second reference signal and the corresponding QCL type when interpreting the TCI state. In one instance, the UE receives the second PDSCH via PDSCH antenna port quasi co-location derived from the index of the second reference signal and the corresponding QCL type in a TCI state applied to receiving the reference CORESET.

Before the UE decodes the first PDCCH successfully, the UE assumes that the TCI state for receiving the first PDSCH is identical to the TCI state applied to the reference CORESET; the UE refers to the index of the first reference signal and the corresponding QCL type when interpreting the TCI state. In one embodiment, the UE receives the first PDSCH via PDSCH antenna port quasi co-location derived from the index of the first reference signal and the corresponding QCL type in a TCI state applied to receiving the reference CORESET.

In one embodiment, the UE may assume that the antenna ports of one DM-RS port group of the first PDSCH are quasi co-located with the RS(s) in the RS set with respect to the QCL type parameter(s) given by the indicated TCI state if the time offset between the reception of the DL DCI of the first PDCCH and the first PDSCH is equal to or greater than a threshold Threshold-Sched-Offset, wherein the threshold is based on UE capability.

In one embodiment, for the cases when TCI-PresentInDCI='Enabled' and when TCI-PresentInDCI='Disabled' or not configured, if the offset between the reception of the DL DCI of the second PDCCH and the second PDSCH is less than the threshold, Threshold-Sched-Offset, the UE may assume that the antenna ports of one DM-RS port group of the second PDSCH are quasi co-located with the second reference signal(s) in the RS set with respect to the QCL type parameter(s) used for the reference CORESET.

In one embodiment, for the cases when TCI-PresentInDCI='Enabled' and when TCI-PresentInDCI='Disabled' or not configured, if the offset between the reception of the DL DCI of the first PDCCH and the first PDSCH is less than the threshold, Threshold-Sched-Offset, the UE may assume that the antenna ports of one DM-RS port group of the first PDSCH are quasi co-located with the first reference signal(s) in the RS set with respect to the QCL type parameter(s) used for the reference CORESET.

In one embodiment, the association, between the TCI state applied to receiving the reference CORESET and the first reference signal, is configured in the configuration of the first serving cell, e.g., the configuration related to cross carrier scheduling, CrossCarrierSchedulingConfig.

In one embodiment, the association, between the TCI state applied for receiving the reference CORESET and the first reference signal, is configured in the configuration of the second serving cell, e.g., the CORESET configuration of the second serving cell.

Another alternative is as follows: before the UE decodes the first PDCCH successfully, the UE assumes that the TCI state for receiving the first PDSCH is identical to the TCI state applied to the reference CORESET.

In some exemplary embodiments, the TCI state applied for receiving the reference COREET is associated with index of reference signals transmitted on the second serving cell and corresponding QCL types.

In some exemplary embodiments, before the UE decodes the first PDCCH successfully, the UE receives the first PDSCH via PDSCH antenna port quasi co-location derived from an index of a first reference signal transmitted in the first serving cell and the corresponding QCL type.

In some exemplary embodiments, the first reference signal is associated with the second reference signal.

In some exemplary embodiments, the first reference signal is derived from the second reference signal.

In some exemplary embodiments, the association between the first reference signal and the second reference signal is (explicitly) configured to the UE.

In some exemplary embodiments, the association between the first reference signal and the second reference signal is specified to the UE, e.g., specified in the specification.

In some exemplary embodiments, the association between the first reference signal and the second reference signal is (implicitly) derived by the UE.

In some exemplary embodiments, the association between the first reference signal and the second reference signal is (implicitly) derived by the UE via a rule, e.g., a mapping between the index of the first reference signal and the index of the second reference signal.

In some exemplary embodiments, the UE may assume that the antenna ports of one DM-RS port group of the first PDSCH are quasi co-located with the RS(s) in the RS set with respect to the QCL type parameter(s) given by the indicated TCI state if the time offset between the reception of the DL DCI of the first PDCCH and the first PDSCH is equal to or greater than a threshold, Threshold-Sched-Offset, wherein the threshold is based on UE capability.

In some exemplary embodiments, for the cases when TCI-PresentInDCI='Enabled' and when TCI-PresentInDCI='Disabled' or not configured, if the offset between the reception of the DL DCI of the second PDCCH and the second PDSCH is less than the threshold, Threshold-Sched-Offset, the UE may assume that the antenna ports of one DM-RS port group of the second PDSCH are quasi co-located with the second reference signal(s) in the RS set with respect to the QCL type parameter(s) used for the reference CORESET.

In some exemplary embodiments, for the cases when TCI-PresentInDCI='Enabled' and when TCI-PresentInDCI='Disabled' or not configured, if the offset between the reception of the DL DCI of the first PDCCH and the first PDSCH is less than the threshold, Threshold-Sched-Offset, the UE may assume that the antenna ports of one DM-RS port group of the first PDSCH are quasi co-located with a first reference signal(s), wherein the first reference signal(s) is associated with the second reference signal(s) in the RS set with respect to the QCL type parameter(s) used for the reference CORESET.

In another embodiment, a UE is configured with a first serving cell and a second serving cell. The control signal of the first serving cell is transmitted on the second serving cell, e.g., PDCCH scheduling PDSCH. The downlink data transmission of the first serving cell is transmitted on the first serving cell. The UE receives or monitors a first PDCCH transmitted on a scheduling CORESET of the second serving cell. A first PDSCH is transmitted on the first serving cell. In one example, the first PDCCH may schedule the first PDSCH.

In one embodiment, the UE receives or monitors a second PDCCH transmitted on the scheduling CORESET. In one embodiment, a second PDSCH is transmitted on the second serving cell. The second PDCCH may schedule the second PDSCH.

In one exemplary embodiment, a reference CORESET is a CORESET with the lowest CORESET-ID in the latest slot in which one or more CORESETs are configured for the UE.

In one exemplary embodiment, the reference CORESET is transmitted on the second serving cell.

In one exemplary embodiment, the reference CORESET may be a CORESET configured for the second serving cell.

Additionally or alternatively, the reference CORESET may be a CORESET configured for the first serving cell.

Additionally or alternatively, the reference CORESET may be a CORESET with the lowest CORESET-ID among CORESETs configured for the first serving cell and the CORESETs configured for the second serving cell.

In one exemplary embodiment, before the UE decodes the second PDCCH successfully, the UE may assume that the PDSCH antenna port quasi co-location for receiving the second PDSCH is based on the quasi co-location information for receiving the reference CORESET.

In one exemplary embodiment, before the UE decodes the first PDCCH successfully, the UE may determine the PDSCH antenna port quasi co-location for receiving the first PDSCH based on a higher layer configuration.

In one exemplary embodiment, before the UE decodes the first PDCCH successfully, the UE may determine the PDSCH antenna port quasi co-location for receiving the first PDSCH based on an indicator.

The following alternatives are provided for determining the TCI state applied to the first PDSCH, or for determining PDSCH antenna port quasi co-location, or before the UE decodes the first PDCCH successfully.

An alternate is as the followings. Before the UE decodes the first PDCCH successfully, the UE assumes that the TCI state for receiving the first PDSCH is identical to a default TCI state.

In one exemplary embodiment, before the UE decodes the first PDCCH successfully, the UE receives the first PDSCH via the PDSCH antenna port quasi co-location derived from the default TCI state.

In one exemplary embodiment, the default TCI state is based on an indicator.

In one exemplary embodiment, if the indicator indicates '1' or 'True' or 'Enabled', the default TCI state is identical to a TCI state for receiving the reference CORESET.

In one exemplary embodiment, if the indicator indicates '0' or 'False or 'Disabled', the default TCI state is identical to a TCI state not for receiving the reference CORESET.

In one exemplary embodiment, if the indicator indicates '0' or 'False or 'Disabled', the default TCI state is one of the TCI states in the activated TCI states for receiving PDSCH in the first serving cell.

Additionally or alternatively, if the indicator indicates '0' or 'False or 'Disabled', the default TCI state is a TCI state mapped to one of codepoints in the TCI field for receiving PDSCH in the first serving cell.

Additionally or alternatively, if the indicator indicates '0' or 'False or 'Disabled', the default TCI state is the TCI state with the lowest TCI state ID in the activated TCI states for receiving PDSCH in the first serving cell.

Additionally or alternatively, if the indicator indicates '0' or 'False or 'Disabled', the default TCI state is a TCI state mapped to codepoint 0 in the TCI field for receiving PDSCH in the first serving cell.

Additionally or alternatively, if the indicator indicates '0' or 'False or 'Disabled', the default TCI state is the TCI state applied to receiving at least one of the CORESETs configured for the first serving cell and/or the second serving cell.

Additionally or alternatively, if the indicator indicates '0' or 'False or 'Disabled', the default TCI state is the TCI state applied to receiving the CORESET with the lowest CORESET ID among the CORESETs configured for the first serving cell and/or the second serving cell.

Alternatively or additionally, the opposite result from the value of the indicator is not precluded.

Alternatively or additionally, regardless of the value of the indicator, before the UE decodes the second PDCCH successfully, the UE assumes that the TCI state for receiving the second PDSCH is identical to a TCI state for receiving the reference CORESET.

In one exemplary embodiment, the UE may assume that the antenna ports of one DM-RS port group of the first PDSCH are quasi co-located with the RS(s) in the RS set with respect to the QCL-type parameter(s) given by the indicated TCI state if the time offset between the reception of the DL DCI of the first PDCCH and the first PDSCH is equal to or greater than a threshold, Threshold-Sched-Offset, wherein the threshold is based on UE capability.

In one exemplary embodiment, for the cases when TCI-PresentInDCI='Enabled' and when TCI-PresentInDCI='Disabled' or not configured, if the offset between the reception of the DL DCI of the first PDCCH and the first PDSCH is less than the threshold, Threshold-Sched-Offset, according to the value of the indicator, the UE may assume that the antenna ports of one DM-RS port group of the first PDSCH are quasi co-located based on the default state.

Another alternative is as follows: at least the TCI state applied to for receiving the reference CORESET is at least associated with an index of the reference signal transmitted in the first serving cell and the corresponding QCL-type.

Additionally or alternatively, at least the TCI state applied to receiving the reference CORESET is at least associated with the index of a first reference signal, the index of a second reference signal, and the corresponding QCL-types. The first reference signal is transmitted on the first serving cell and the second reference signal is transmitted on the second serving cell.

In one exemplary embodiment, if the indicator indicates '1' or 'True' or 'Enabled', before the UE decodes the first PDCCH successfully, the UE assumes that the TCI state for receiving the first PDSCH is identical to the TCI state applied to receiving the reference CORESET; the UE refers to the index of the first reference signal and the corresponding QCL type when interpreting the TCI state for receiving the reference CORESET; in one example, the UE receives the first PDSCH via PDSCH antenna port quasi co-location derived from the index of the first reference signal and the corresponding QCL type in a TCI state applied to receiving the reference CORESET.

In one exemplary embodiment, if the indicator indicates '0' or 'False' or 'Disabled', before the UE decodes the first PDCCH successfully, the UE assumes that the TCI state for receiving the first PDSCH is identical to the TCI state applied to receiving the reference CORESET; the UE refers to the index of the second reference signal and the corresponding QCL type when interpreting the TCI state for receiving the reference CORESET; in one exemplary embodiment, the UE receives the first PDSCH via PDSCH antenna port quasi co-location derived from the index of the second reference signal and the corresponding QCL type in a TCI state applied to receiving the reference CORESET.

In one exemplary embodiment, the opposite result from the value of the indicator is not precluded.

In one exemplary embodiment, regardless of the value of the indicator, before the UE decodes the second PDCCH successfully, the UE assumes that the TCI state for receiving the second PDSCH is identical to the TCI state applied for receiving the reference CORESET; the UE refers to the index of the second reference signal and the corresponding QCL type when interpreting the TCI state regardless of the value of the indicator. In one exemplary embodiment, the UE receives the first PDSCH via PDSCH antenna port quasi co-location derived from the index of the second reference signal and the corresponding QCL type in a TCI state applied for receiving the reference CORESET.

In one exemplary embodiment, the association between the TCI state applied to the reference CORESET and the first reference signal is configured in the configuration of the first serving cell, e.g., the configuration related to cross carrier scheduling, CrossCarrierSchedulingConfig.

In one exemplary embodiment, the association between the TCI state applied for the reference CORESET and the first reference signal is configured in the configuration of the second serving cell, e.g. the CORESET configuration of the second serving cell.

In one exemplary embodiment, the UE may assume that the antenna ports of one DM-RS port group of the first PDSCH are quasi co-located with the RS(s) in the RS set with respect to the QCL-type parameter(s) given by the indicated TCI state if the time offset between the reception of the DL DCI of the first PDCCH and the first PDSCH is equal to or greater than a threshold, Threshold-Sched-Offset, wherein the threshold is based on UE capability.

In one exemplary embodiment, for the cases when TCI-PresentInDCI='Enabled' and when TCI-PresentInDCI='Disabled' or not configured, according to the value of the indicator, and if the offset between the reception of the DL DCI of the second PDCCH and the second PDSCH is less than the threshold, Threshold-Sched-Offset, the UE may assume that the antenna ports of one DM-RS port group of the second PDSCH are quasi co-located with the second reference signal(s) in the RS set with respect to the QCL-type parameter(s) used for the reference CORESET.

In one exemplary embodiment, for the cases when TCI-PresentInDCI='Enabled' and when TCI-PresentInDCI='Disabled' or not configured, according to the value of the indicator, and if the offset between the reception of the DL DCI of the first PDCCH and the first PDSCH is less than the threshold Threshold-Sched-Offset, the UE may assume that the antenna ports of one DM-RS port group of the first PDSCH are quasi co-located with the first reference signal(s) in the RS set with respect to the QCL-type parameter(s) used for the reference CORESET.

Another alternative is as follows: if the indicator indicates '1' or 'True' or 'Enabled', the TCI state applied to receive the reference CORESET is associated with the index of the reference signals transmitted on the second serving cell and corresponding QCL types. Before the UE decodes the first PDCCH successfully, the UE assumes that the TCI state for receiving the first PDSCH is identical to the TCI state applied for receiving the reference CORESET. Before the UE decodes the second PDCCH successfully, the UE assumes that the TCI state for receiving the second PDSCH is identical to the TCI state applied for receiving the reference CORESET.

If the indicator indicates '0' or 'False or 'Disabled', at least the TCI state applied to receive the reference CORESET is at least associated with the index of a first reference signal an index of a second reference signal, and the corresponding QCL-types. The first reference signal is transmitted on the first serving cell and the second reference signal is transmitted on the second serving cell.

If the indicator indicates '0' or 'False or 'Disabled', before the UE decodes the first PDCCH successfully, the UE assumes that the TCI state for receiving the first PDSCH is identical to the TCI state applied for receiving the reference CORESET; the UE refers to the index of the first reference signal and corresponding QCL-type when interpreting the TCI state; in one example, the UE receives the first PDSCH via a PDSCH antenna port quasi co-location derived from the index of the first reference signal and the corresponding QCL-type in a TCI state applied to receive the reference CORESET.

If the indicator indicates '0' or 'False or 'Disabled', before the UE decodes the second PDCCH successfully, the UE assumes that the TCI state for receiving the second PDSCH is identical to the TCI state applied to receive the reference CORESET; the UE refers to the index of the second reference signal and the corresponding QCL-type when interpreting the TCI state; in one example, the UE receives the second PDSCH via a PDSCH antenna port quasi co-location derived from the index of the second reference signal and the corresponding QCL-type in a TCI state applied to receive the reference CORESET.

In one exemplary embodiment, the opposite result from the value of the indicator is not precluded.

In one exemplary embodiment, the association between the TCI state applied to the reference CORESET and the first reference signal is configured in the configuration of the first serving cell, e.g., the configuration related to the cross carrier scheduling, CrossCarrierSchedulingConfig.

In one exemplary embodiment, the association between the TCI state applied to the reference CORESET and the first reference signal is configured in the configuration of the second serving cell, e.g., the CORESET configuration of the second serving cell.

In one exemplary embodiment, the UE may assume that the antenna ports of one DM-RS port group of the first PDSCH are quasi co-located with the RS(s) in the RS set with respect to the QCL-type parameter(s) given by the indicated TCI state if the time offset between the reception of the DL DCI of the first PDCCH and the first PDSCH is equal to or greater than a threshold, Threshold-Sched-Offset, wherein the threshold is based on UE capability.

In one exemplary embodiment, in the cases when TCI-PresentInDCI='Enabled' and when TCI-PresentInDCI='Disabled' or not, according to the value of the indicator, and if the offset between the reception of the DL DCI of the second PDCCH and the second PDSCH is less than the threshold, Threshold-Sched-Offset, the UE may assume that the antenna ports of one DM-RS port group of the first PDSCH are quasi co-located with the RS(s) in the RS set with respect to the QCL-type parameter(s) used for the reference CORESET.

In one exemplary embodiment, in the cases when TCI-PresentInDCI='Enabled' and when TCI-PresentInDCI='Disabled' or not configured, according to the value of the indicator, and if the offset between the reception of the DL DCI of the first PDCCH and the first PDSCH is less than the threshold, Threshold-Sched-Offset, the UE may assume that the antenna ports of one DM-RS port group of the first PDSCH are quasi co-located with the first reference signal(s) in the RS set with respect to the QCL-type parameter(s) used for the reference CORESET.

In another embodiment, a UE is configured with a first serving cell and a second serving cell by the network. The control signal of the first serving cell is transmitted on the second serving cell, e.g., PDCCH scheduling PDSCH. The downlink data transmission of the first serving cell is transmitted on the first serving cell. The UE receives or monitors a first PDCCH transmitted on a scheduling CORESET of the second serving cell. A first PDSCH is transmitted on the first serving cell. In one embodiment, the first PDCCH may schedule the first PDSCH.

In one exemplary embodiment, the UE receives or monitors a second PDCCH transmitted on the scheduling CORE-SET. A second PDSCH is transmitted on the second serving cell. The second PDCCH may schedule the second PDSCH.

In one exemplary embodiment, the UE may be configured by a network a parameter indicating that the time offset between the reception of the DCI of the first PDCCH and the first PDSCH is possible to be less than the threshold value, Threshold-Sched-Offset.

In one exemplary embodiment, the UE may be configured by a network a parameter indicating that the time offset between the reception of the DCI of the first PDCCH and the first PDSCH is less than the threshold value, Threshold-Sched-Offset.

In one exemplary embodiment, the UE may be configured by a network a parameter indicating that the time offset between the reception of the DCI of the first PDCCH and the first PDSCH is greater than or equal to the threshold value, Threshold-Sched-Offset.

In one exemplary embodiment, the UE may be configured by a network a parameter indicating that the time offset between the reception of the DCI of the second PDCCH and the second PDSCH is possible to be less than the threshold value, Threshold-Sched-Offset.

In one exemplary embodiment, the UE may be configured by a network a parameter indicating that the time offset between the reception of the DCI of the second PDCCH and the second PDSCH is less than the threshold value, Threshold-Sched-Offset.

Alternatively, the UE may be configured by a network parameter indicating that the time offset between the reception of the DCI of the second PDCCH and the second PDSCH is greater than or equal to the threshold value, Threshold-Sched-Offset.

In one or more of the above-disclosed embodiments, a reference CORESET is a CORESET with the lowest CORESET-ID in the latest slot in which one or more CORESETs are configured for the UE.

In one or more of the above-disclosed embodiments, the reference CORESET is transmitted on the second serving cell.

In one or more of the above-disclosed embodiments, the reference CORESET is monitored by the UE on the second serving cell.

In one or more of the above-disclosed embodiments, the latest slot in which one or more CORESETs are configured for the UE means the latest slot with one or more CORESETs configured to be monitored by the UE.

In one or more of the above-disclosed embodiments, the reference CORESET is selected by finding the latest slot with one or more CORESETs configured to be monitored by the UE, and the reference CORESET is the CORESET with lowest CORESET-ID among those CORESETs monitored within the latest slot.

In one or more of the above-disclosed embodiments, the reference CORESET may be a CORESET configured for the second serving cell.

Additionally or alternatively, the reference CORESET may be a CORESET configured for the first serving cell.

Additionally or alternatively, the reference CORESET may be a CORESET with the lowest CORESET-ID among the CORESETs configured for the first serving cell and the CORESETs configured for the second serving cell.

In one or more of the above-disclosed embodiments, the UE may expect the time offset between the reception of the DCI of the first PDCCH and the first PDSCH to be greater than or equal to a threshold.

In one or more of the above-disclosed embodiments, the UE may not expect the time offset between the reception of the DCI of the first PDCCH and the first PDSCH to be less than the threshold. This may mean that the UE does not receive and/or buffer the first PDSCH before the UE successfully decodes the first PDCCH. Also, this may mean that the UE does not receive and/or buffer the first PDSCH if the time offset between the reception of the DCI of the first PDCCH and the first PDSCH is less than the threshold value, Threshold-Sched-Offset. This also may mean that the network prevents from or is not allowed to set or configure the time offset between reception of the DCI of the first PDCCH and the first PDSCH to be less than a threshold value, Threshold-Sched-Offset. This also may mean that the network does not transmit the first PDSCH if the time offset between the reception of the DCI of the first PDCCH and the first PDSCH is less than the threshold value, Threshold-Sched-Offset.

Additionally or alternatively, for those cases when TCI-PresentInDCI='Enabled' and TCI-PresentInDCI='Disabled' or not configured, the UE may not expect the time offset between the reception of the DCI of the first PDCCH and the first PDSCH to be less than a threshold.

In one or more of the above-disclosed embodiments, the UE may receive and/or buffer the second PDSCH via the TCI state used for the PDCCH quasi co-location indication of the reference CORESET, before the UE successfully decodes the second PDCCH.

In one or more of the above-disclosed embodiments, the UE may receive and/or buffer the second PDSCH via the TCI state used for PDCCH quasi co-location indication of the reference CORESET, if the time offset between the reception of the DCI of the first PDCCH and the first PDSCH is less than a threshold value, Threshold-Sched-Offset.

In one or more of the above-disclosed embodiments, the network may transmit the second PDSCH based on the TCI state used for the PDCCH quasi co-location indication of the reference CORESET, if the time offset between the reception of the DCI of the second PDCCH and the second PDSCH is less than a threshold value, Threshold-Sched-Offset.

In one or more of the above-disclosed embodiments, if the time offset between the reception of the DCI of the first PDCCH and the first PDSCH is less than the threshold, the UE does not receive and/or decode the first PDSCH or the remaining portion of the first PDSCH.

In one or more of the above-disclosed embodiments, if the time offset between the reception of the DCI of the first PDCCH and the first PDSCH is less than the threshold, the UE discards the first PDSCH or the remaining portion of the first PDSCH.

In one or more of the above-disclosed embodiments, if the time offset between the reception of the DCI of the first PDCCH and the first PDSCH is less than a threshold value, the UE detects or considers the first PDCCH as an inconsistent control information.

In one or more of the above-disclosed embodiments, if the time offset between the reception of the DCI of the first PDCCH and the first PDSCH is less than a threshold value, the UE does not transmit an acknowledgement signal, which corresponds to the first PDSCH, to the network, e.g., ACK/NACK. This may mean that the network does not (expect to) receive an acknowledgement signal from the UE, wherein the acknowledgement signal corresponds to the first PDSCH, if the network transmits the first PDSCH and the time offset between the reception of the DCI of the first PDCCH and the first PDSCH is less than the threshold value, Threshold-Sched-Offset.

Notably, the above-disclosed embodiments can be applied to the cases when TCI-PresentInDCI='Enabled' and when TCI-PresentInDCI='Disabled' or not configured. For example, for those cases when TCI-PresentInDCI='Enabled' and when TCI-PresentInDCI='Disabled' or not configured, if the time offset between the reception of the DCI of the first PDCCH and the first PDSCH is less than a threshold value, the UE does not transmit an acknowledgement signal (e.g., ACK/NACK), which corresponds to the first PDSCH, to the network.

In one or more of the above-disclosed embodiments, the threshold value is related to the time duration needed for the UE to successfully decode a PDCCH. Additionally, the threshold is related to UE capability. Additionally, the threshold can be Threshold-Sched-Offset.

In one or more of the above-disclosed embodiments, the UE may buffer a PDSCH if the time offset between the reception of PDSCH and the corresponding scheduling DCI is less than the threshold value.

In one or more of the above-disclosed embodiments, the UE may buffer a PDSCH if the time offset between the reception of PDSCH and the corresponding scheduling DCI is less than the threshold, which means the UE (will try to) receive the PDSCH before successfully decoding the corresponding scheduling DCI.

In one or more of the above-disclosed embodiments, if the network configures a CORESET configuration for a scheduled serving cell, the UE may not use the parameter providing quasi co-location information for receiving a PDCCH in the CORESETs of a scheduling serving cell.

In one or more of the above-disclosed embodiments, if the network configures a CORESET configuration for a scheduled serving cell, the UE may ignore the parameter providing the quasi co-location information for receiving a PDCCH in the CORESETs of a scheduling serving cell.

In one or more of the above-disclosed embodiments, the network prevents from configuring a CORESET configuration for a scheduled serving cell.

In one or more of the above-disclosed embodiments, if the network configures a CORESET configuration for a scheduled serving cell, the parameter providing the quasi co-location information for the receiving PDCCH is not allowed to be configured.

In one or more of the above-disclosed embodiments, if the network configures a CORESET configuration for a scheduled serving cell, the parameter providing the quasi co-location information for the receiving PDCCH is ignored or not used when the PDCCH of the scheduled serving cell is transmitted on a scheduling serving cell.

According to one exemplary method, the UE receives or monitors a first PDCCH transmitted on a scheduling CORESET of a second serving cell, wherein the first PDCCH schedules a first PDSCH transmitted on a first serving cell; the UE receives the first PDSCH via the PDSCH antenna port quasi co-location derived from a default TCI state before the UE decodes the first PDCCH successfully.

In another method, for those cases when TCI-PresentInDCI='Enabled' and TCI-PresentInDCI='Disabled', if the offset between the reception of the DL DCI of the first PDCCH and the first PDSCH is less than the threshold Threshold-Sched-Offset, the UE may assume that the antenna ports of one DM-RS port group of the first PDSCH are quasi co-located based on the TCI state used for the default state.

In one or more of the above-disclosed methods, the default TCI state is one of TCI states in the activated TCI states for receiving PDSCH in the first serving cell.

In one or more of the above-disclosed methods, the default TCI state is a TCI state mapped to one of codeponints in the TCI field for receiving PDSCH in the first serving cell.

In one or more of the above-disclosed methods, the default TCI state is a TCI state with the lowest TCI state ID in the activated TCI states for receiving PDSCH in the first serving cell.

In one or more of the above-disclosed methods, the default TCI state is a TCI state with the lowest TCI state ID in the configured TCI states for receiving at least downlink transmission in the first serving cell.

In one or more of the above-disclosed methods, the default TCI state is a TCI state mapped to codepoint 0 in the TCI field for receiving PDSCH in the first serving cell.

In one or more of the above-disclosed methods, the default TCI state is a TCI state applied for receiving at least one of CORESETs configured for the first serving cell and/or the second serving cell.

In one or more of the above-disclosed methods, the default TCI state is a TCI state applied for receiving the CORESET with the lowest CORESET ID among the CORESETs configured for the first serving cell and/or the second serving cell.

In one or more of the above-disclosed methods, the default TCI state is a TCI state applied for receiving the CORESET with the lowest CORESET ID among the CORESETs configured for the first serving cell and/or the second serving cell.

According to another exemplary method, the UE receives or monitors a first PDCCH transmitted on a scheduling CORESET of a second serving cell, wherein the first PDCCH schedules a first PDSCH transmitted on a first serving cell; the UE assumes that the TCI state for the first PDSCH is identical to a TCI state applied for receiving a reference CORESET before the UE successfully decodes the first PDCCH; the UE receives the first PDSCH via PDSCH antenna port quasi co-location derived from the index of a first reference signal transmitted in the first serving cell and corresponding QCL type in a TCI state applied for receiving the reference CORESET.

In another method, the reference CORESET is a CORESET configured for the second serving cell with the lowest CORESET-ID in the latest slot in which one or more CORESETs are configured for the UE.

In one or more of the above-disclosed methods, the UE refers to the index of a first reference signal and the corresponding QCL type when interpreting a TCI state applied to the reference CORESET.

In one or more of the above-disclosed methods, the UE receives or monitors a second PDCCH transmitted on the scheduling CORESET, wherein the second PDCCH schedules a second PDSCH transmitted on the second serving cell.

In one or more of the above-disclosed methods, before the UE successfully decodes the second PDCCH, the UE assumes that the TCI state for receiving the second PDSCH is identical to a TCI state applied to the reference CORESET; and the UE refers to the index of a second reference signal and the corresponding QCL-type when interpreting a TCI state applied to the reference CORESET.

In one or more of the above-disclosed methods, a TCI state applied to receiving the scheduling CORESET is at least associated with the index of the first reference signals, the index of the second reference signal, and the corresponding QCL types.

In one or more of the above-disclosed methods, the first reference signal is transmitted on the first serving cell.

In one or more of the above-disclosed methods, the second reference signal is transmitted on the second serving cell.

In one or more of the above-disclosed methods, the association between a TCI state applied to the reference CORESET and the first reference signal is configured in the configuration of the first serving cell, e.g. the configuration related to cross carrier scheduling, CrossCarrierSchedulingConfig.

In one or more of the above-disclosed methods, the association between a TCI state applied to the reference CORESET and the first reference signal is configured in the configuration of the second serving cell, e.g. CORESET configuration of the second serving cell.

According to another exemplary method, the UE receives or monitors a first PDCCH transmitted on a scheduling CORESET of a second serving cell, wherein the first PDCCH schedules a first PDSCH transmitted on a first serving cell; the UE assumes that the TCI state for the first PDSCH is identical to a TCI state applied for receiving a reference CORESET before the UE decodes the first PDCCH successfully, wherein the TCI state comprises index of a second reference signal transmitted on the second serving cell; and the UE receives the first PDSCH via a PDSCH antenna port quasi co-location derived from the index of a first reference signal transmitted in the first serving cell and the corresponding QCL type.

In another method, the reference CORESET is a CORESET configured for the second serving cell with the lowest CORESET-ID in the latest slot in which one or more CORESETs are configured for the UE.

In another method, the association between the first reference signal and the second reference signal is explicitly configured to the UE.

In one or more of the above-disclosed methods, the association between the first reference signal and the second reference signal is specified to the UE, e.g., specified in the specification.

In one or more of the above-disclosed methods, the association between the first reference signal and the second reference signal is (implicitly) derived by the UE.

In one or more of the above-disclosed methods, the association between the first reference signal and the second reference signal is (implicitly) derived by the UE via a rule, e.g. the index number of the first reference signal and the second reference signal.

According to another exemplary method, the UE receives or monitors a first PDCCH transmitted on a scheduling CORESET of a second serving cell, wherein the first PDCCH schedules a first PDSCH transmitted on a first serving cell; the UE determines a PDSCH antenna port quasi co-location for receiving the first PDSCH based on an indicator before the UE successfully decodes the first PDCCH; and the UE receives the first PDSCH via PDSCH antenna port quasi co-location derived from a default TCI state, wherein the default TCI state is based on the value of the indicator.

In another method, if the indicator indicates '1' or 'True' or 'Enabled', the UE assumes that the default TCI state is identical to a TCI state applied to the reference CORESET.

In one or more of the above-disclosed methods, if the indicator indicates '0' or 'False' or 'Disabled', the default TCI state is a TCI state mapped to one of codepoints in the TCI field for receiving PDSCH in the first serving cell.

In one or more of the above-disclosed methods, if the indicator indicates '0' or 'False' or 'Disabled', the default TCI state is a TCI state with the lowest TCI state ID in the activated TCI states for receiving PDSCH in the first serving cell.

In one or more of the above-disclosed methods, if the indicator indicates '0' or 'False' or 'Disabled', the default TCI state is a TCI state mapped to codepoint 0 in the TCI field for receiving PDSCH in the first serving cell.

In one or more of the above-disclosed methods, if the indicator indicates '0' or 'False' or 'Disabled', the default TCI state is a TCI state applied to receiving at least one of CORESETs configured for the first serving cell and/or the second serving cell.

In one or more of the above-disclosed methods, if the indicator indicates '0' or 'False' or 'Disabled', the default TCI state is a TCI state applied to receiving the CORESET with the lowest CORESET ID among the CORESETs configured for the first serving cell and/or the second serving cell.

In one or more of the above-disclosed methods, for those the cases when TCI-PresentInDCI='Enabled' and TCI-PresentInDCI='Disabled', if the offset between the reception of the DL DCI of the first PDCCH and the first PDSCH is less than Threshold-Sched-Offset, the UE may assume that the antenna ports of one DM-RS port group of the first PDSCH are quasi co-located based on the default state.

In one or more of the above-disclosed methods, before the UE successfully decodes the first PDCCH, the UE assumes the TCI state for receiving the second PDSCH is identical to the TCI state applied to the reference CORESET.

According to another exemplary method, the UE receives or monitors a first PDCCH transmitted on a scheduling CORESET of a second serving cell, wherein the first PDCCH schedules a first PDSCH transmitted on a first serving cell; the UE assumes that the TCI state for receiving the first PDSCH is identical to a TCI state applied for the reference CORESET before the UE successfully decodes the first PDCCH, wherein the TCI state applied to receiving the reference CORESET is at least associated with the index of a first reference signals, the index of a second reference signal, and the corresponding QCL types; and the UE receives the first PDSCH via a PDSCH antenna port quasi co-location derived from the index of a first reference signal and the corresponding QCL type based on the value of the indicator.

In another method, the reference CORESET is a CORESET configured for the second serving cell with the lowest CORESET-ID in the latest slot in which one or more CORESETs are configured for the UE.

In one or more of the above-disclosed methods, the UE receives or monitors a second PDCCH transmitted on the scheduling CORESET, wherein the second PDCCH schedules a second PDSCH transmitted on the second serving cell.

In one or more of the above-disclosed methods, the UE interprets the TCI state applied to the reference CORESET based on an indicator.

In one or more of the above-disclosed methods, the first reference signal is transmitted on the first serving cell.

In one or more of the above-disclosed methods, the second reference signal is transmitted on the second serving cell.

In one or more of the above-disclosed methods, the association between the TCI state applied to the reference CORESET and the first reference signal is configured in the configuration of the first serving cell, e.g. configuration related to cross carrier scheduling, CrossCarrierScheduling-Config.

In one or more of the above-disclosed methods, the association between the TCI state applied for the reference CORESET and the first reference signal is configured in the configuration of the second serving cell, e.g. CORESET configuration of the second serving cell.

In one or more of the above-disclosed methods, if the indicator indicates '1' or 'True' or 'Enabled', the UE refers to the index of the first reference signal and the corresponding QCL type when interpreting the TCI state applied to the reference CORESET.

In one or more of the above-disclosed methods, if the indicator indicates '0' or 'False' or 'Disabled', the UE refers to the index of the first reference signal and the corresponding QCL type when interpreting the TCI state applied to the reference CORESET.

In one or more of the above-disclosed methods, before the UE successfully decodes the second PDCCH, the UE assumes that the TCI state for receiving the second PDSCH is identical to a TCI state applied to the reference CORESET; and the UE refers to the index of the second reference signal and QCL type when interpreting a TCI state applied to the reference CORESET regardless of the value of the indicator.

In another method, if the indicator indicates '1' or 'True' or 'Enabled', the TCI state applied to receiving the reference CORESET is associated with the index of reference signals transmitted on the second serving cell and the corresponding QCL types.

In another method, if the indicator indicates '0' or 'False' or 'Disabled', the TCI state applied to receiving the reference CORESET is at least associated with the index of a first reference signals, the index of a second reference signal, and the corresponding QCL types.

In one or more of the above-disclosed methods, if the indicator indicates '0' or 'False' or 'Disabled', and before the UE successfully decodes the first PDCCH, the UE receives the first PDSCH via a PDSCH antenna port quasi co-location derived from the index of the first reference signal and the corresponding QCL type in a TCI state applied to receiving the reference CORESET.

In one or more of the above-disclosed methods, if the indicator indicates '0' or 'False' or 'Disabled', and before the UE successfully decodes the second PDCCH, the UE receives the second PDSCH via a PDSCH antenna port quasi co-location derived from the index of the second reference signal and the corresponding QCL type in a TCI state applied to receiving the reference CORESET.

According to another exemplary method, the UE receives or monitors a first PDCCH transmitted on a scheduling CORESET of a second serving cell, wherein the first PDCCH schedules a first PDSCH transmitted on a first serving cell; the UE discards the first PDSCH or the remaining portion of the first PDSCH if the time offset between the reception of the DCI of the first PDCCH and the first PDSCH is less than a threshold.

In another method, if the time offset between the reception of the DCI of the first PDCCH and the first PDSCH is less than the threshold, the UE does not receive and/or decode the first PDSCH or the remaining portion of the first PDSCH.

In one or more of the above-disclosed methods, if the time offset between the reception of the DCI of the first PDCCH and the first PDSCH is less than the threshold, the UE detects or considers the first PDCCH is an inconsistent control information.

In one or more of the above-disclosed methods, if the time offset between the reception of the DCI of the first PDCCH and the first PDSCH is less than the threshold, the UE does not transmit an acknowledgement signal, which corresponds to the first PDSCH, to network, e.g. ACK/NACK.

In one or more of the above-disclosed methods, the threshold is related to the time duration needed for the UE to successfully decode a PDCCH.

In one or more of the above-disclosed methods, the threshold is related to UE capability.

In one or more of the above-disclosed methods, the threshold can be Threshold-Sched-Offset.

Figure 6:
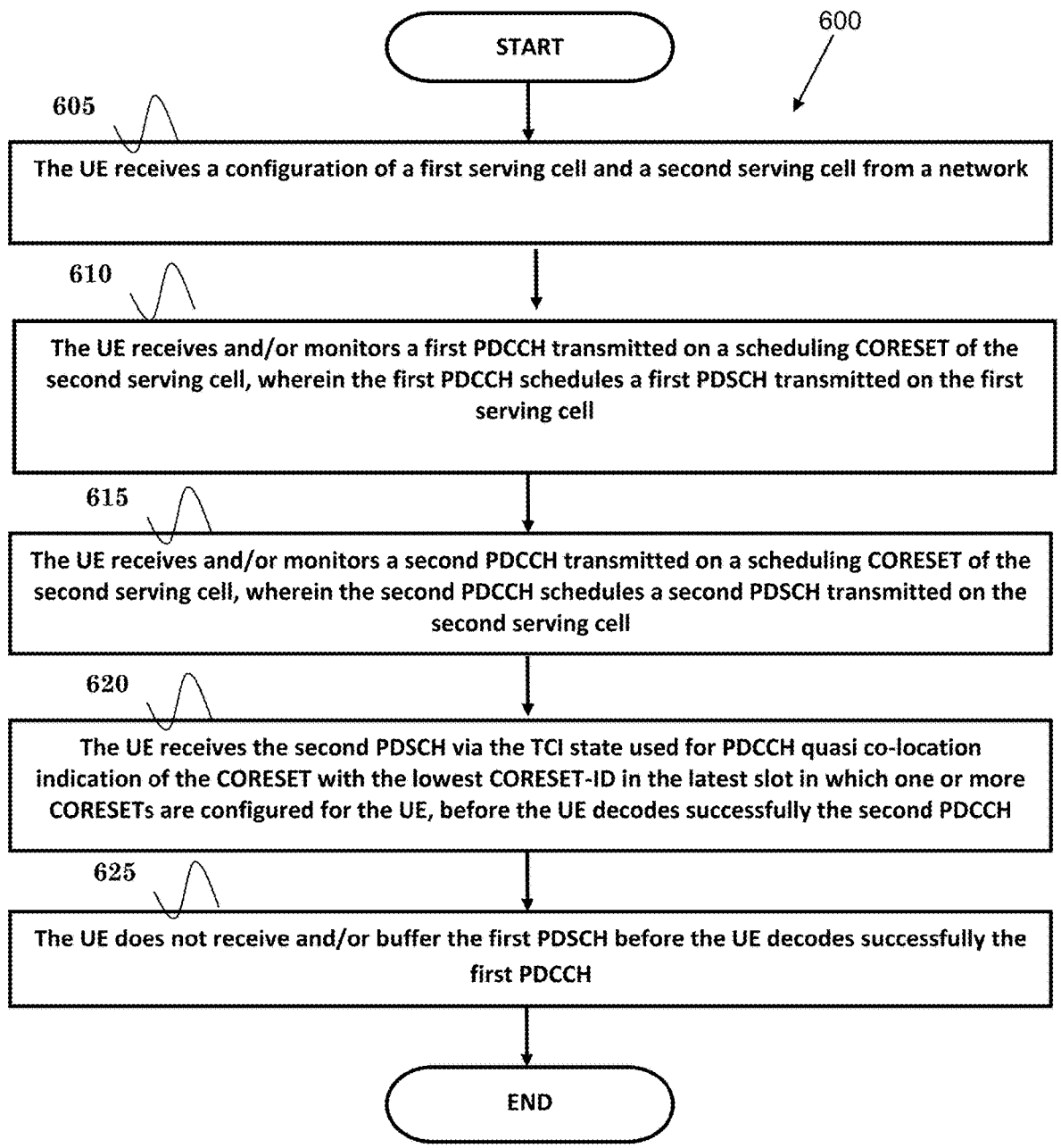
FIG. 6 is a flow diagram for one exemplary embodiment from the perspective of a User Equipment (UE).

FIG. 6 is a flow chart 600 according to one exemplary embodiment from the perspective of a UE. In step 605, the UE receives a configuration of a first serving cell and a second serving cell from a network. In step 610, the UE receives and/or monitors a first PDCCH transmitted on a scheduling CORESET of the second serving cell, wherein the first PDCCH schedules a first PDSCH transmitted on the first serving cell. In step 615, the UE receives and/or monitors a second PDCCH transmitted on a scheduling CORESET of the second serving cell, wherein the second PDCCH schedules a second PDSCH transmitted on the second serving cell. In step 620, the UE receives and/or buffers the second PDSCH via the TCI state used for PDCCH quasi co-location indication of the CORESET with the lowest CORESET-ID in the latest slot in which one or more CORESETs are configured for the UE, before the UE decodes successfully the second PDCCH. In step 625, the UE does not receive and/or buffer the first PDSCH before the UE decodes successfully the first PDCCH, i.e. the UE decodes successfully the first PDCCH before the UE receives and/or buffers the first PDSCH.

In one embodiment, the UE is configured a first serving cell and a second serving cell by a network.

In another method, the UE is configured with a parameter indicating that the time offset between the reception of the DCI of the first PDCCH and the first PDSCH may be less than the threshold value, Threshold-Sched-Offset.

In one or more of the above-disclosed methods, the UE is configured with a parameter indicating that the time offset between the reception of the DCI of the second PDCCH and the second PDSCH is possible to be less than the threshold value, Threshold-Sched-Offset.

In one or more of the above-disclosed methods, the UE expects the time offset between the reception of the DCI of the first PDCCH and the first PDSCH is greater than or equal to a threshold value, Threshold-Sched-Offset.

In one or more of the above-disclosed methods, the threshold value, Threshold-Sched-Offset, is related to the UE capability and/or the time duration needed for the UE to successfully decode a PDCCH.

In one or more of the above-disclosed methods, the UE does not receive and/or buffer the first PDSCH if the time offset between the reception of the DCI of the first PDCCH and the first PDSCH is less than the threshold value, Threshold-Sched-Offset.

In one or more of the above-disclosed methods, if the time offset between the reception of the DCI of the second PDCCH and the second PDSCH is less than a threshold value, Threshold-Sched-Offset, the UE receives and/or buffers the second PDSCH via the TCI state used for the PDCCH quasi co-location indication of the CORESET with the lowest CORESET-ID in the latest slot in which one or more CORESETs are configured for the UE.

In one or more of the above-disclosed methods, if the network configures a CORESET configuration for a scheduled serving cell, the UE does not use the parameter providing the quasi co-location information for receiving the PDCCH in the CORESETs of a scheduling serving cell.

In one or more of the above-disclosed methods, if the network configures a CORESET configuration for the scheduled serving cell, the UE ignores the parameter providing the quasi co-location information for receiving the PDCCH in the CORESETs of a scheduling serving cell.

Figure 7:
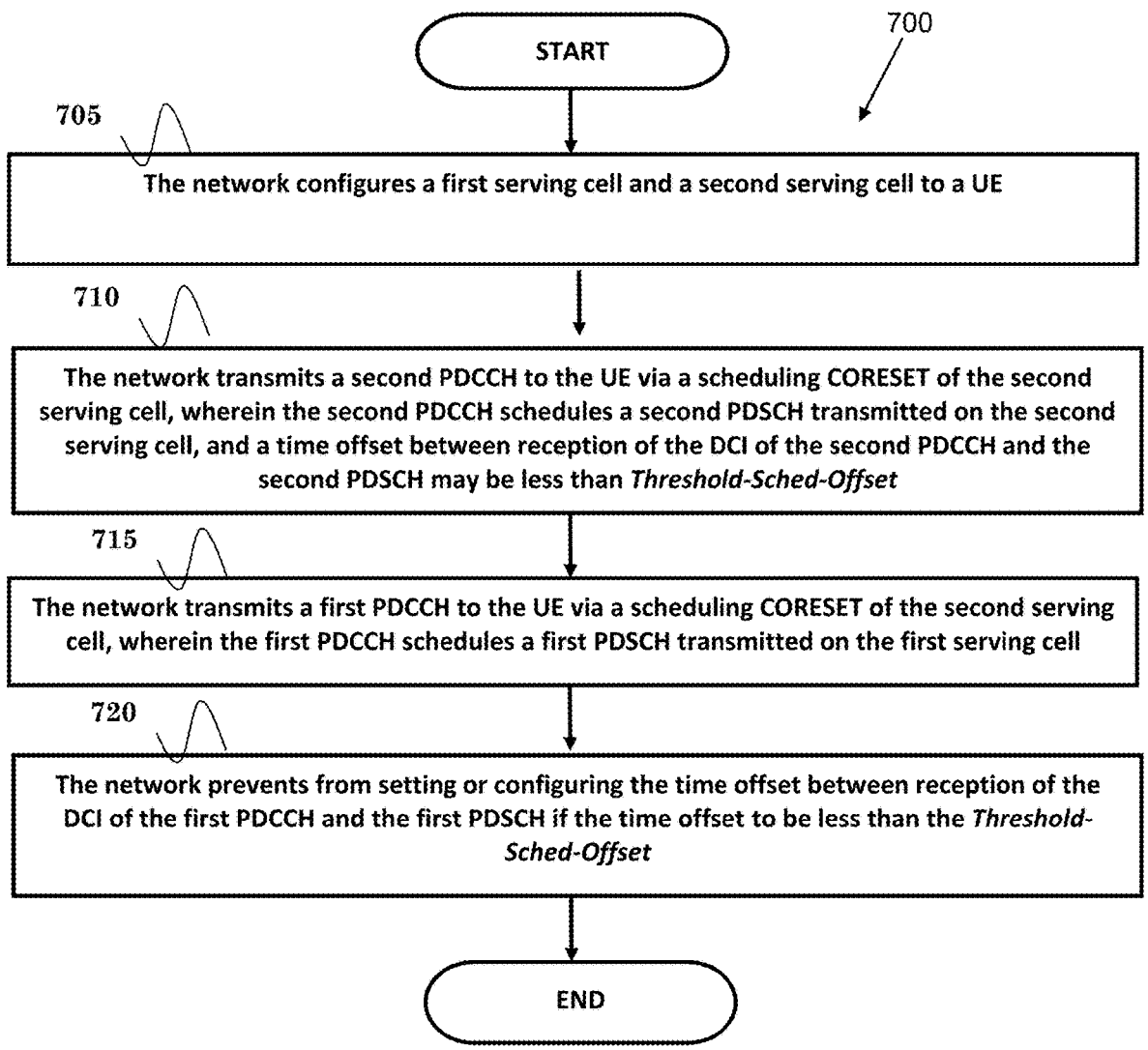
FIG. 7 is a flow diagram for one exemplary embodiment from the perspective of a network.

FIG. 7 is a flow chart 700 according to one exemplary embodiment from the perspective of a network. In step 705, the network configures a first serving cell and a second serving cell to a UE. In step 710, the network transmits a second PDCCH to the UE via a scheduling CORESET of the second serving cell, wherein the second PDCCH schedules a second PDSCH transmitted on the second serving cell, and a time offset between reception of the DCI of the second PDCCH and the second PDSCH may be less than a threshold value, Threshold-Sched-Offset. In step 715, the network transmits a first PDCCH to the UE via a scheduling CORESET of the second serving cell, wherein the first PDCCH schedules a first PDSCH transmitted on the first serving cell. In step 720, the network prevents from setting or configuring the time offset between reception of the DCI of the first PDCCH and the first PDSCH to be less than a threshold value, Threshold-Sched-Offset.

In one or more of the above-disclosed methods, the network is not allowed to set or configure the time offset between reception of the DCI of the first PDCCH and the first PDSCH is less than the threshold value, Threshold-Sched-Offset.

In one or more of the above-disclosed methods, the network configures to the UE a parameter indicating that the time offset between the reception of the DCI of the first PDCCH and the first PDSCH is greater than or equal to the threshold value, Threshold-Sched-Offset.

In one or more of the above-disclosed methods, the network configures to the UE a parameter indicating that the time offset between the reception of the DCI of the second PDCCH and the second PDSCH may be less than the threshold value, Threshold-Sched-Offset.

In one or more of the above-disclosed methods, the threshold value, Threshold-Sched-Offset, is related to UE capability and/or the time duration needed for the UE to decode a PDCCH successfully.

In one or more of the above-disclosed methods, the network does not transmit the first PDSCH if the time offset between the reception of the DCI of the first PDCCH and the first PDSCH is less than the threshold value, Threshold-Sched-Offset.

In one or more of the above-disclosed methods, the network transmits the second PDSCH based on the TCI state used for the PDCCH quasi co-location indication of the CORESET with the lowest CORESET-ID in the latest slot in which one or more CORESETs are configured for the UE, if the time offset between the reception of the DCI of the second PDCCH and the second PDSCH is less than a threshold value, Threshold-Sched-Offset.

In one or more of the above-disclosed methods, the network does not receive an acknowledgement signal from the UE, wherein the acknowledgement signal corresponds to the first PDSCH, if the network transmits the first PDSCH and the time offset between the reception of the DCI of the first PDCCH and the first PDSCH is less than the threshold value, Threshold-Sched-Offset.

In one or more of the above-disclosed methods, the network prevents from configuring a CORESET configuration for a scheduled serving cell.

In one or more of the above-disclosed methods, if the network configures a CORESET configuration for a scheduled serving cell, a parameter providing the quasi co-location information for receiving PDCCH is not allowed to be configured.

In one or more of the above-disclosed methods, if the network configures a CORESET configuration for a scheduled serving cell, a parameter providing the quasi co-location information for receiving PDCCH is ignored or not used when PDCCH of the scheduled serving cell is transmitted on a scheduling serving cell.

As those skilled in the art will appreciate, the various disclosed embodiments may be combined to form new embodiments and/or methods.

Referring back to FIGS. 3 and 4, in one embodiment, the device 300 includes a program code 312 stored in memory 310. The CPU 308 could execute program code 312 to (i) receive a configuration of a first serving cell and a second serving cell from a network, (ii) receive and/or monitor a first PDCCH transmitted on a scheduling CORESET of the second serving cell, wherein the first PDCCH schedules a first PDSCH transmitted on the first serving cell, (iii) receive and/or monitor a second PDCCH transmitted on a scheduling CORESET of the second serving cell, wherein the second PDCCH schedules a second PDSCH transmitted on the second serving cell, (iv) receive and/or buffer the second PDSCH via the TCI state used for PDCCH quasi co-location indication of the CORESET with the lowest CORESET-ID in the latest slot in which one or more CORESETs are configured for the UE, before the UE decodes successfully the second PDCCH, and (v) to not receive and/or buffer the first PDSCH before the UE decodes successfully the first PDCCH.

In another embodiment, the device includes a program code 312 stored in the memory 310. The CPU 308 could execute program code 312 to (i) configure a first serving cell and a second serving cell to a UE, (ii) transmit a second PDCCH to the UE via a scheduling CORESET of the second serving cell, wherein the second PDCCH schedules a second PDSCH transmitted on the second serving cell, and the time offset between reception of the DCI of the second PDCCH and the second PDSCH may be less than a threshold value, Threshold-Sched-Offset, (iii) transmit a first PDCCH to the UE via a scheduling CORESET of the second serving cell, wherein the first PDCCH schedules a first PDSCH transmitted on the first serving cell, (iv) prevent from setting or configuring the time offset between reception of the DCI of the first PDCCH and the first PDSCH to be less than a threshold value, Threshold-Sched-Offset.

Furthermore, the CPU 308 can execute the program code 312 to perform all of the above-described actions and steps or others methods described herein.

The above-disclosed methods assists in avoiding ambiguity of beam usage indication during downlink data buffering considering cross carrier scheduling.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method of a User Equipment (UE), the method comprising:
    receiving a configuration of a first serving cell and a second serving cell from a network;
    receiving and/or monitoring a first Physical Downlink Control Channel (PDCCH) transmitted on the second serving cell, wherein the first PDCCH schedules a first Physical Downlink Shared Channel (PDSCH) transmitted on the first serving cell;
    receiving and/or monitoring a second PDCCH transmitted on the second serving cell, wherein the second PDCCH schedules a second PDSCH transmitted on the second serving cell;
    receiving and/or buffering the second PDSCH based on a first Transmission Configuration Indication (TCI) state used for PDCCH quasi co-location indication of a reference Control Resource Set (CORESET) if a time offset between reception of Downlink Control Information (DCI) of the second PDCCH and the second PDSCH is less than a threshold; and
    receiving and/or buffering the first PDSCH based on a second TCI state, wherein the second TCI state comprises the lowest TCI state ID (Identity) in activated TCI states for receiving PDSCH in the first serving cell, if a time offset between reception of DCI of the first PDCCH and the first PDSCH is less than the threshold.

2. The method of claim 1, wherein the reference CORESET is a CORESET with lowest CORESET-ID among those CORESETs monitored within the latest slot.

3. The method of claim 1, wherein the threshold is related to UE capability or the time duration needed for the UE to successfully decode the PDCCH.

4. The method of claim 1, further comprising:
    receiving and/or buffering the second PDSCH based on the first TCI state before the UE decodes successfully the second PDCCH.

5. The method of claim 1, further comprising:
    receiving and/or buffering the first PDSCH based on the second TCI state before the UE decodes successfully the first PDCCH.

6. The method of claim 1, wherein the first serving cell is a scheduled serving cell and the second serving cell is a scheduling serving cell.

7. A method for a network, the method comprising:
    configuring a first serving cell and a second serving cell to a User Equipment (UE);
    transmitting a second Physical Downlink Control Channel (PDCCH) to the UE on the second serving cell, wherein the second PDCCH schedules a second Physical Downlink Shared Channel (PDSCH) transmitted on the second serving cell;
    transmitting a first PDCCH to the UE on the second serving cell, wherein the first PDCCH schedules a first PDSCH transmitted on the first serving cell;
    transmitting the second PDSCH based on a first Transmission Configuration Indication (TCI) state used for PDCCH quasi co-location indication of a reference Control Resource Set (CORESET), if a time offset between reception of Downlink Control Information (DCI) of the second PDCCH and the second PDSCH is less than a threshold; and
    transmitting the first PDSCH based on a second TCI state, wherein the second TCI state comprises the lowest TCI state ID (Identity) in activated TCI states for receiving PDSCH in the first serving cell, if a time offset between reception of DCI of the first PDCCH and the first PDSCH is less than the threshold.

8. The method of claim 7, wherein the reference CORESET is a CORESET with lowest CORESET-ID among those CORESETs monitored within the latest slot.

9. The method of claim 7, wherein the threshold is related to UE capability or the time duration needed for the UE to successfully decode the PDCCH.

10. The method of claim 7, wherein the first serving cell is a scheduled serving cell and the second serving cell is a scheduling serving cell.

11. A network, comprising:
    a processor;
    a memory operatively coupled to the processor, wherein the processor is configured to execute a program code to:
        configure a first serving cell and a second serving cell to a User Equipment (UE);
        transmit a second Physical Downlink Control Channel (PDCCH) to the UE on the second serving cell, wherein the second PDCCH schedules a second Physical Downlink Shared Channel (PDSCH) transmitted on the second serving cell;
        transmit a first PDCCH to the UE on the second serving cell, wherein the first PDCCH schedules a first PDSCH transmitted on the first serving cell;
        transmit the second PDSCH based on a first Transmission Configuration Indication (TCI) state used for PDCCH quasi co-location indication of a reference Control Resource Set (CORESET), if a time offset between reception of Downlink Control Information (DCI) of the second PDCCH and the second PDSCH is less than a threshold; and transmit the first PDSCH based on a second TCI state, wherein the second TCI state comprises the lowest TCI state ID (Identity) in activated TCI states for receiving PDSCH in the first serving cell, if a time offset between reception of DCI of the first PDCCH and the first PDSCH is less than the threshold.

12. The network of claim 11, wherein the reference CORESET is a CORESET with lowest CORESET-ID among those CORESETs monitored within the latest slot.

13. The network of claim 11, wherein the threshold is related to UE capability or the time duration needed for the UE to successfully decode the PDCCH.

14. The network of claim 11, wherein the first serving cell is a scheduled serving cell and the second serving cell is a scheduling serving cell.

* * * * *